United States Patent
Mitchell et al.

(10) Patent No.: US 11,054,514 B2
(45) Date of Patent: Jul. 6, 2021

(54) RADAR BEAM FORMING SHIELD FOR MOTOR VEHICLE

(71) Applicant: MAGNA CLOSURES INC., Newmarket (CA)

(72) Inventors: J. R. Scott Mitchell, Newmarket (CA); Gabriele Wayne Sabatini, Keswick (CA); Jeffrey Richard F. Domenchini, Etobicoke (CA); Kurt Matthew Schatz, Aurora (CA)

(73) Assignee: MAGNA CLOSURES INC., Newmarket (CA)

( * ) Notice: Subject to any disclaimer, the term of this patent is extended or adjusted under 35 U.S.C. 154(b) by 239 days.

(21) Appl. No.: 16/190,486

(22) Filed: Nov. 14, 2018

(65) Prior Publication Data
US 2019/0153770 A1     May 23, 2019

Related U.S. Application Data

(60) Provisional application No. 62/589,726, filed on Nov. 22, 2017.

(51) Int. Cl.
| | |
|---|---|
| *G01S 13/56* | (2006.01) |
| *G01S 7/02* | (2006.01) |
| *H01Q 15/02* | (2006.01) |
| *H01Q 1/42* | (2006.01) |
| *G01S 13/931* | (2020.01) |

(52) U.S. Cl.
CPC ......... *G01S 13/56* (2013.01); *E05Y 2900/546* (2013.01); *G01S 13/931* (2013.01); *G01S 2007/027* (2013.01); *H01Q 1/42* (2013.01); *H01Q 15/02* (2013.01)

(58) Field of Classification Search
CPC ...... G01S 13/931; G01S 13/56; G01S 7/2925; G01S 2007/027; H01Q 1/42; H01Q 15/02
USPC ...................................................... 342/27, 28
See application file for complete search history.

(56) References Cited

U.S. PATENT DOCUMENTS

| | | | | |
|---|---|---|---|---|
| 4,346,774 A | * | 8/1982 | Hirota ................ | B60R 16/0237 180/167 |
| 8,604,968 B2 | * | 12/2013 | Alland ..................... | B60R 1/00 342/70 |
| 8,874,324 B2 | * | 10/2014 | Eggers .................... | E05F 15/76 701/49 |
| 9,063,230 B2 | * | 6/2015 | Alland ................ | H01Q 9/0435 |
| 9,097,800 B1 | * | 8/2015 | Zhu ...................... | G01S 7/4802 |
| 9,293,812 B2 | * | 3/2016 | Shi ......................... | H01Q 21/08 |
| 9,768,517 B2 | * | 9/2017 | Binzer ................... | H01Q 17/00 |
| 9,797,179 B2 | * | 10/2017 | Washeleski ............ | E05F 15/40 |

(Continued)

*Primary Examiner* — Erin F Heard
*Assistant Examiner* — Michael W Justice
(74) *Attorney, Agent, or Firm* — Dickinson Wright PLLC

(57) ABSTRACT

A detection module for a closure panel of a motor vehicle and method for sensing at least one of an object and a motion adjacent a closure panel of a vehicle to facilitate operation of the closure panel is provided. The detection module includes a housing and a radar emitting sensor disposed in the housing. The radar emitting sensor is configured to sense at least one of an object and a motion adjacent the closure panel and to output data corresponding to at least one of an object and motion. A radar shield portion is operably attached to the housing. The radar shield portion is configured to shape a radar beam and form a patterned detection zone emitted from the radar emitting sensor.

15 Claims, 18 Drawing Sheets

(56) References Cited

U.S. PATENT DOCUMENTS

| | | | | |
|---|---|---|---|---|
| 9,845,629 | B2* | 12/2017 | Washeleski | E05F 15/40 |
| 9,859,613 | B2* | 1/2018 | Pontes | G01S 13/02 |
| 10,017,977 | B2* | 7/2018 | Newman | B60R 25/2045 |
| 10,443,292 | B2* | 10/2019 | Baruco | B60R 1/12 |
| 2003/0216817 | A1* | 11/2003 | Pudney | E05B 81/78 |
| | | | | 700/17 |
| 2005/0174077 | A1* | 8/2005 | Haag | E05F 15/43 |
| | | | | 318/280 |
| 2006/0125919 | A1* | 6/2006 | Camilleri | H04N 7/183 |
| | | | | 348/148 |
| 2011/0163904 | A1* | 7/2011 | Alland | B60R 1/00 |
| | | | | 342/1 |
| 2012/0123649 | A1* | 5/2012 | Eggers | E05F 15/76 |
| | | | | 701/49 |
| 2014/0118179 | A1* | 5/2014 | Alland | H01Q 1/1271 |
| | | | | 342/22 |
| 2015/0123838 | A1* | 5/2015 | Shi | H01Q 21/0075 |
| | | | | 342/70 |
| 2017/0306684 | A1* | 10/2017 | Baruco | B60R 1/06 |
| 2018/0065545 | A1* | 3/2018 | McMahon | B60Q 1/30 |
| 2018/0301797 | A1* | 10/2018 | Allouis | H01Q 15/14 |

* cited by examiner

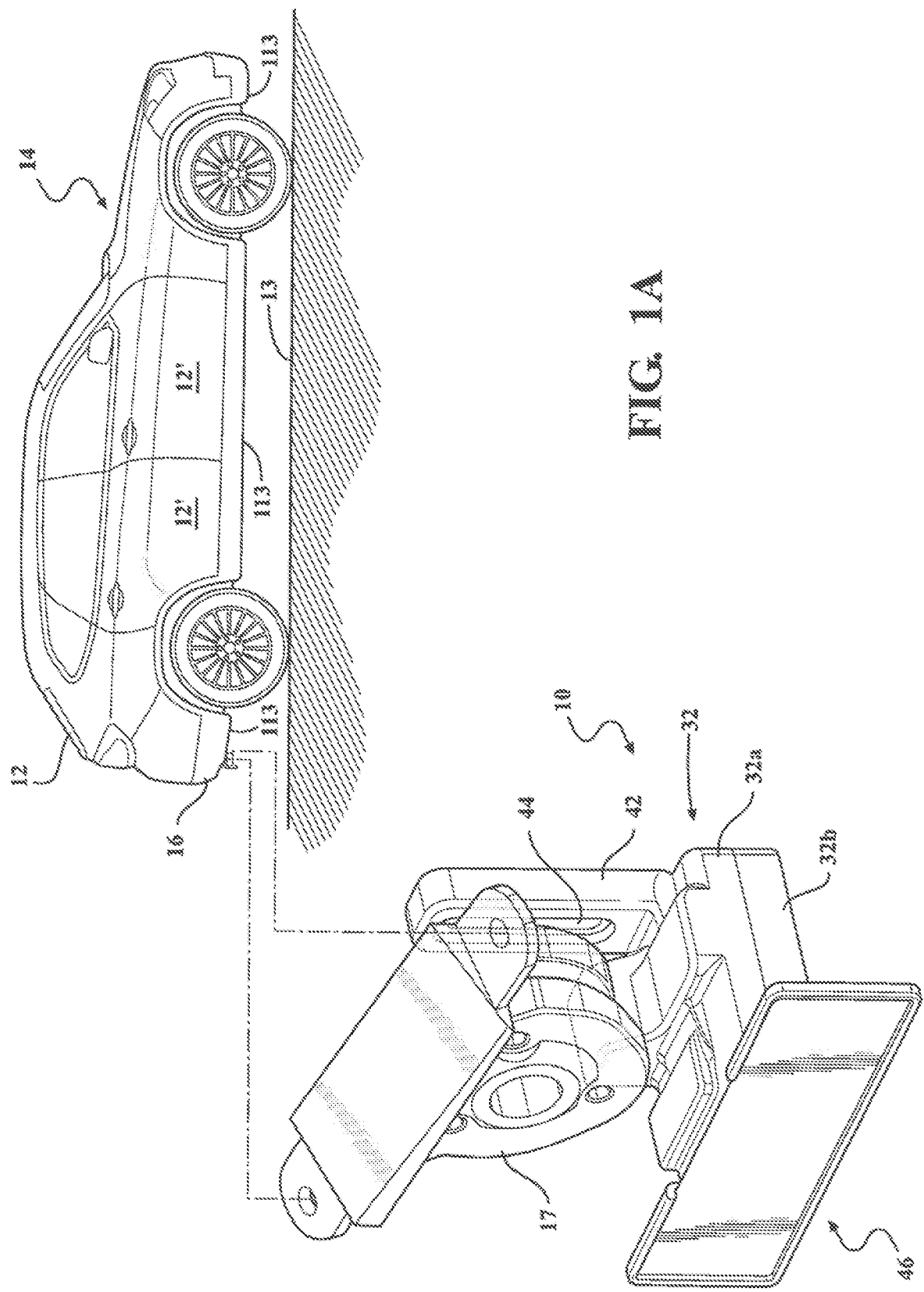

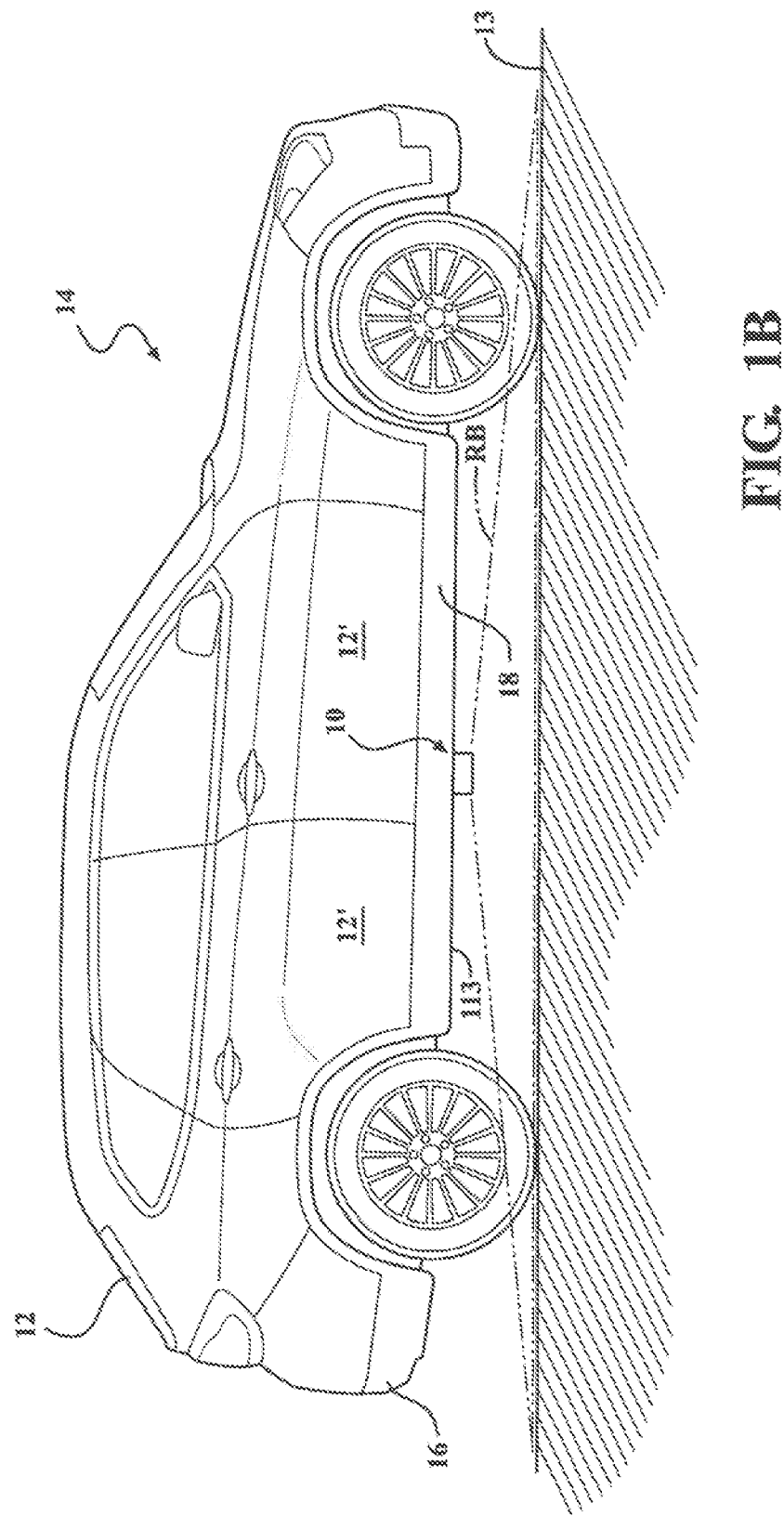

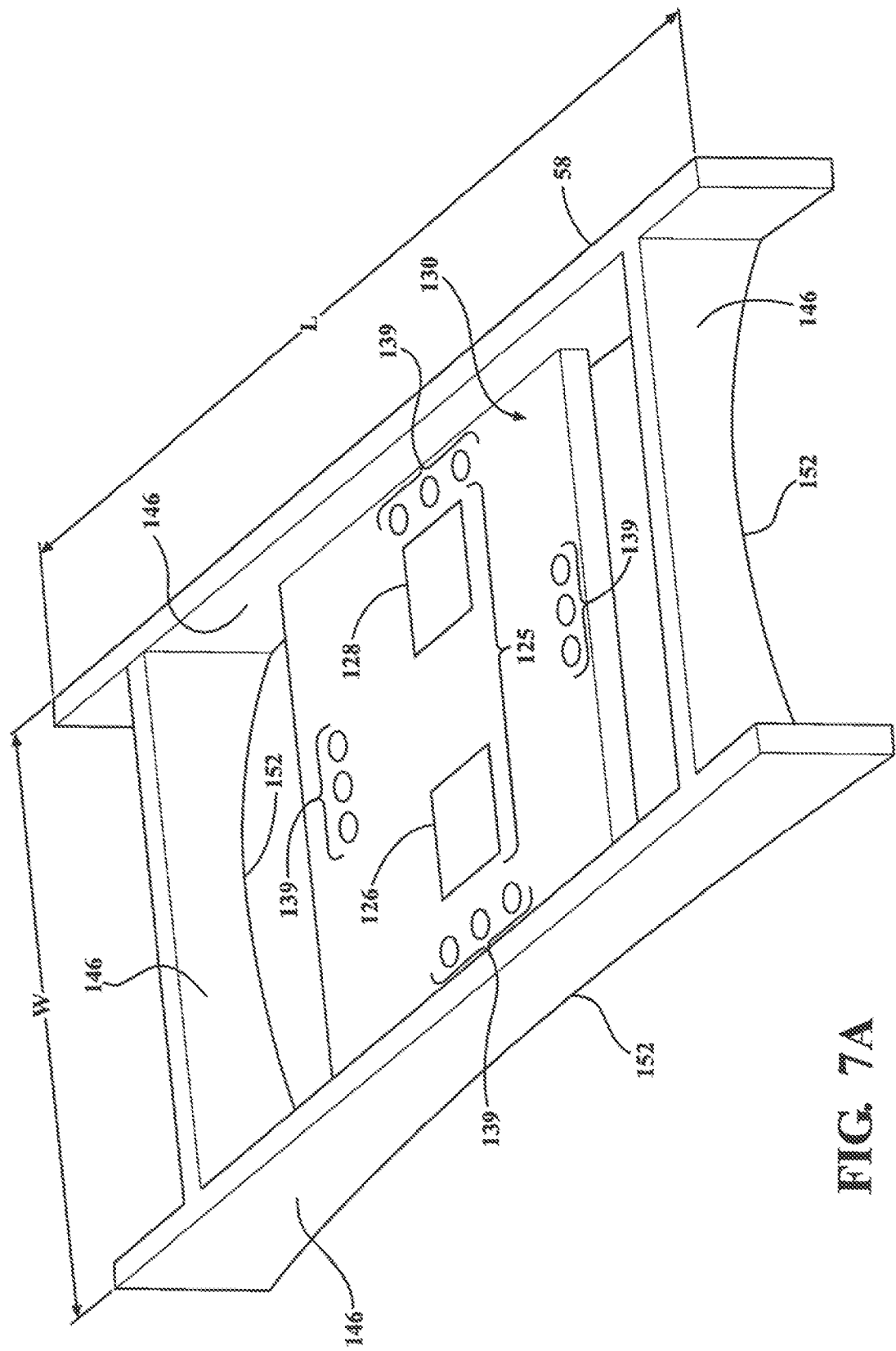

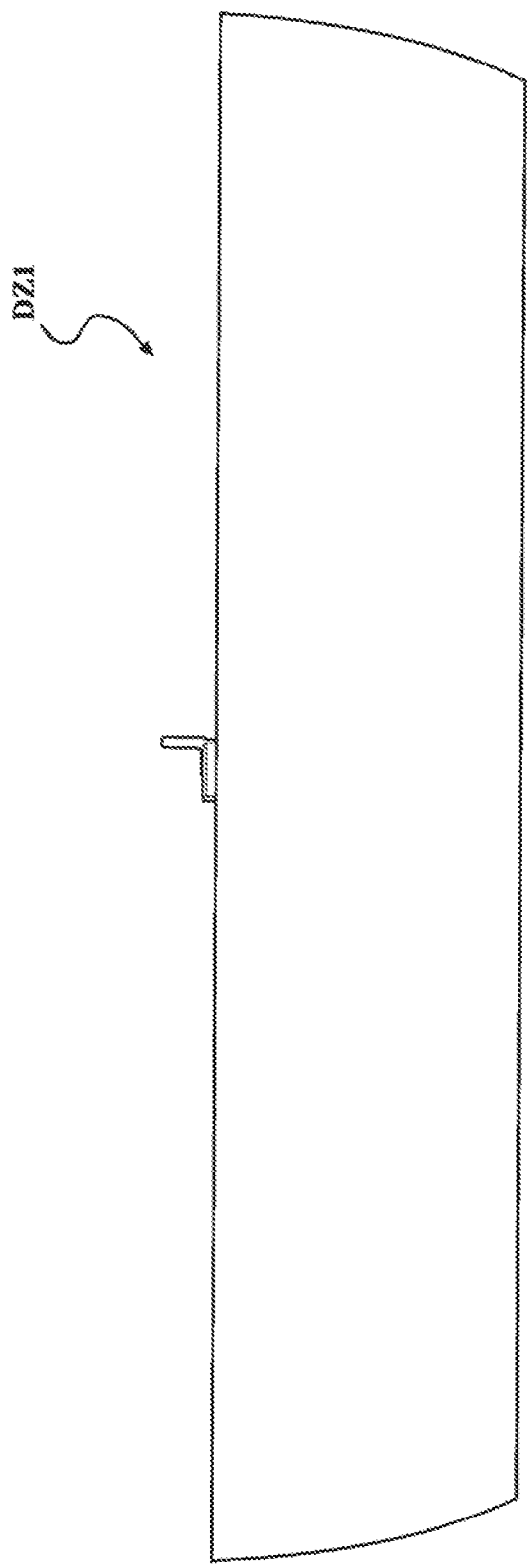

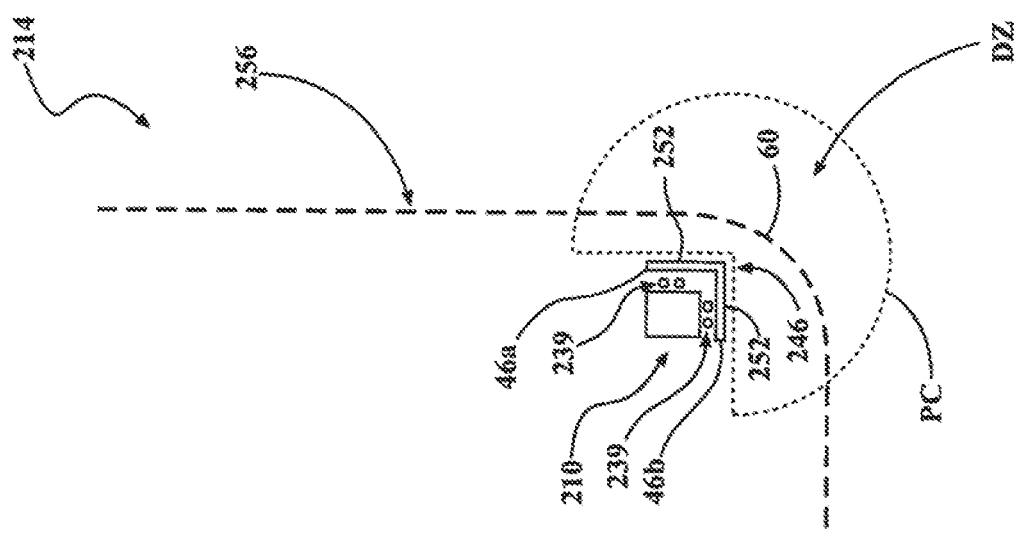
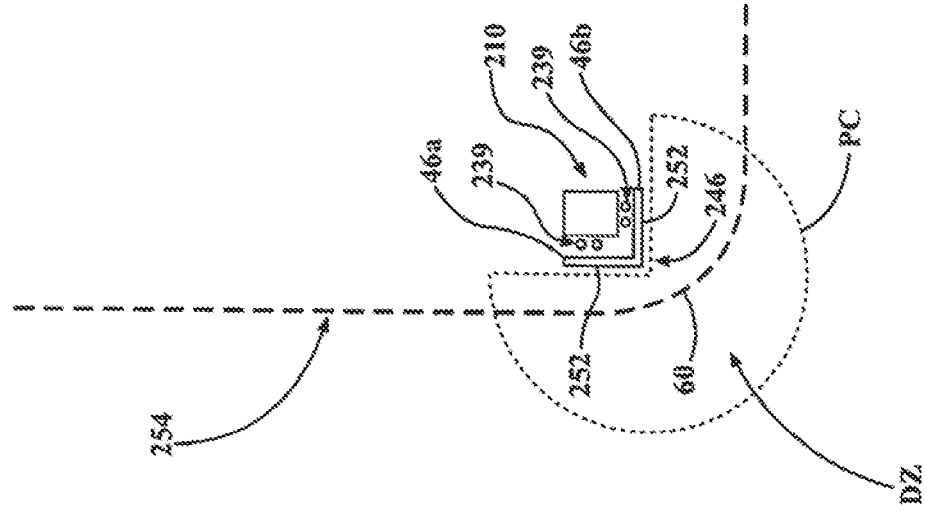
FIG. 9

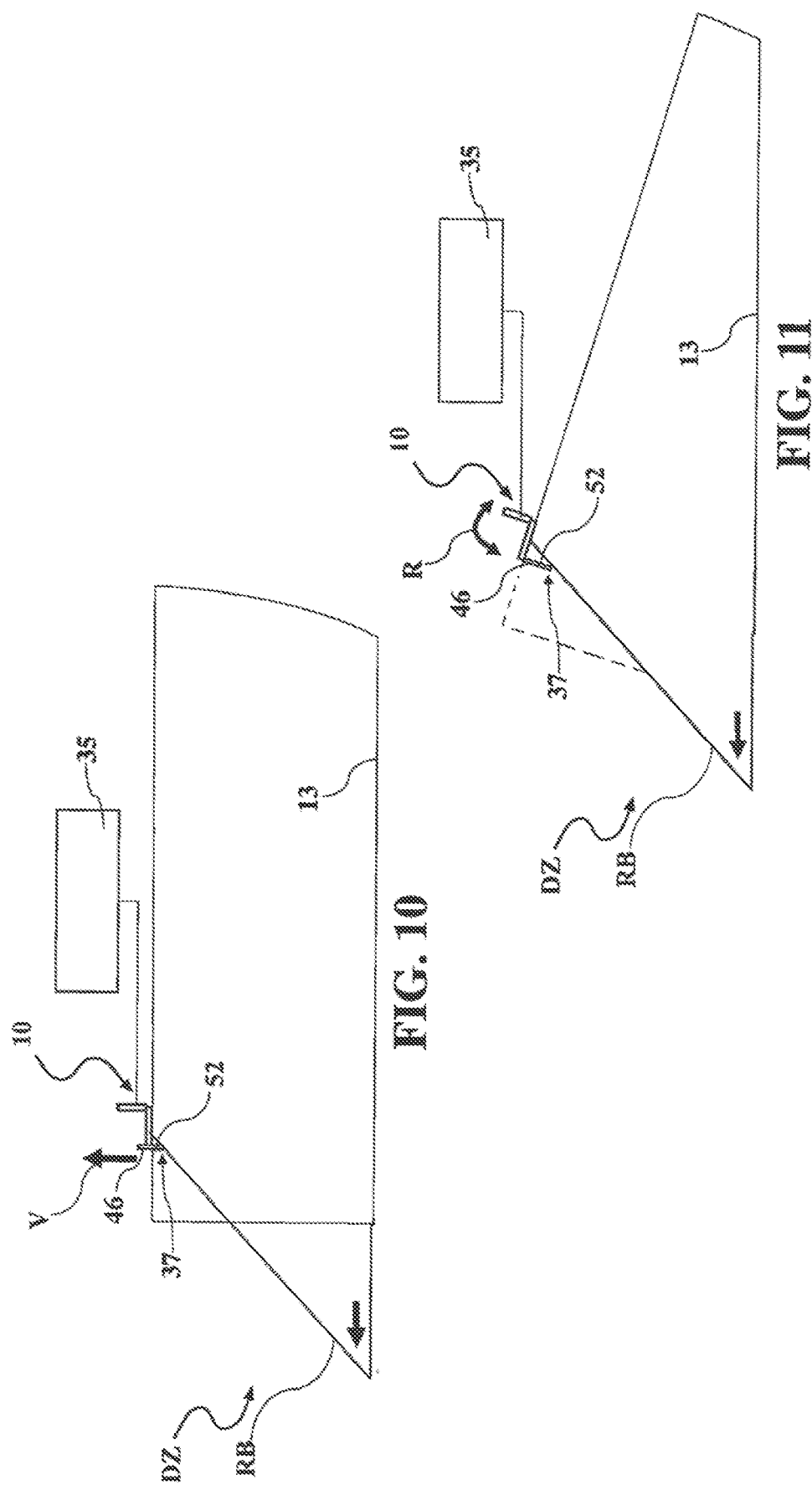

RADAR BEAM FORMING SHIELD FOR MOTOR VEHICLE

CROSS-REFERENCE TO RELATED APPLICATION

This application claims the benefit of U.S. Provisional Application Ser. No. 62/589,726, filed Nov. 22, 2017, which is incorporated herein by reference in its entirety.

FIELD

The present disclosure relates generally to a detection system for motor vehicles and, more particularly to a radar based detection system for a vehicle closure panel.

BACKGROUND

This section provides background information related to the present disclosure which is not necessarily prior art.

Vehicles are now being equipped with different sensor systems that perform different functions. These functions may be related to gesture recognition for access control, reverse parking obstacle detection for notifying the driver of obstacles during reverse, and obstacle detection for detecting obstacles when the closure panel is being opened and closed.

For example, vehicles may be provided with a gesture activated system which can detect foot or hand movements for opening the closure panel (e.g., liftgate of the vehicle) based on the gesture made. Typically, because of range restrictions of the technology used, sensors of such a gesture activated system may be provided in the bumper and pointed toward the ground to detect foot gestures. Also, for example, vehicles may be provided with a park assist system with sensors generally directed outwards from the vehicle to detect objects when reversing the vehicle, such as parked cars, posts, people, etc., to which the driver is alerted to upon detection (e.g., most sport utility vehicles (SUVs) with lift gates use multiple ultrasonic sensors in the bumper for detection during reverse). Also, for example, the vehicle may include an obstacle detection system with sensors provided to sense an obstacle in the path of the closure panel opening, or for detecting an obstacle when the closure panel is closing. Thus, in such an obstacle detection system, the sensor beams would be required to be directed both outwardly (away) from the exterior of the closure panel and away from the interior of the closure panel.

Nevertheless, the gesture activated system, park assist system, and obstacle detection system are commonly distinct systems, and tailored for the specific function (i.e. designed for specific areas of coverage such as either the ground, the area in front of the closure panel, or an area facing inwardly from the closure panel). Having multiple systems performing different functions requires separate sensors tailored for each specific application, with each having specific coverage zones, and requiring multiple position placement on a closure panel. In each of the above applications, it is desired that the respective system only be activated or otherwise detect the presence of an object when intended and when necessary, thereby avoiding unwanted and unintentional detections of gestures and objects.

For example, with regard to closure panels (e.g. powered lift gates), and in particular to gesture activated systems therefor, the detection of a foot or hand gesture can be used to open such panels. This can be beneficial, particularly when a user's hands are occupied. However, it is desired to avoid unintended detections (false triggering), such as of a pedestrian walking nearby the user's vehicle but not intending to trigger actuation of the closure panel. Accordingly, in many cases a fine line exists between a zone within an intended region of detection verses a zone outside the intended region of detection. As such, it is known to deploy multiple sensors throughout specific locations of the vehicle in an attempt to sense gestures only within specifically identified (shaped) zones; however, limiting the separate sensors to precisely identified zones remains challenging and costly. Accordingly, an inability to precisely regulate and shape the zone over which a sensor of a detection system detects a gesture intended to be detected remains, thereby resulting in unintentional and unwanted opening of closure panels, while also resulting, in some cases, in closure panels not opening when a gesture is made with the intention of opening the closure panel.

Accordingly, there remains a need for improved detection systems used on motor vehicles that overcome these and other shortcomings of known detections systems.

SUMMARY

This section provides a general summary of the disclosure and is not intended to be a comprehensive listing of its full scope or of all features, advantages, aspects and objectives associated with the inventive concepts described and illustrated in the detailed description provided herein.

It is an object of the present disclosure to provide a detection system for use in a motor vehicle that addresses and overcomes the above-noted shortcomings.

It is a further object of the present disclosure to provide a detection system for use in a motor vehicle that is economical in manufacture and in use.

Accordingly, it is an aspect of the present disclosure to provide a detection module for a closure panel of a motor vehicle that includes a housing and a radar emitting sensor disposed in the housing. The radar emitting sensor is configured to sense at least one of an object and a motion adjacent the closure panel and to output data corresponding to at least one of an object and motion. A radar shield portion is operably attached to the housing. The radar shield portion is configured to shape a radar pattern emitted from the radar emitting sensor, thereby facilitating a precise, as intended detection of the object and/or motion.

It is a further aspect of the present disclosure to provide the radar shield portion having a substantially planar wall.

It is a further aspect of the present disclosure to provide the radar shield portion having an annular wall.

It is a further aspect of the present disclosure to provide the annular wall surrounding a printed circuit board carrying the radar emitting sensor.

It is a further aspect of the present disclosure to configure the annular wall to shape the radar pattern about the entirety of a periphery of the vehicle.

It is a further aspect of the present disclosure to provide the radar shield portion having a shaped metal insert.

It is a further aspect of the present disclosure to configure the radar shield portion from a radiopaque material.

It is a further aspect of the present disclosure to provide the radar shield portion having a plurality of sides extending in oblique relation with one another.

It is a further aspect of the present disclosure to provide the radar shield portion having at least a pair of sides extending in transverse relation with one another, such that the radar shield portion can be disposed at a corner of the vehicle to form a radar pattern along adjacent sides of the corner.

It is a further aspect of the present disclosure to provide a detection module for a motor vehicle including a housing; a printed circuit board disposed in the housing, and a radar emitting sensor disposed on the printed circuit board, with the radar emitting sensor being configured to emit radar and detect at least one of an object and a motion about the entirety of a periphery of the motor vehicle.

In another aspect, there is provided a detection system for a vehicle for providing operation of a vehicle closure panel. The detection system includes a detection module including a housing, a printed circuit board disposed in said housing, and a radar emitting sensor disposed on said printed circuit board, the radar emitting sensor being configured to emit radar and detect at least one of an object and a motion about at least a portion of the vehicle. The detection module also includes a controller unit coupled to the radar emitting sensor and in communication with a plurality of vehicle systems and a closure panel actuation mechanism and configured to communicate with the plurality of vehicle systems, detect at least one of an object and a motion about at least a portion of the vehicle, determine whether the detected at least one of an object and a motion matches a stored object or gesture pattern, and control the closure panel actuation mechanism in response to communication with the plurality of vehicle systems and in response to the detected at least one of an object and a motion matching the stored object or gesture pattern.

In another aspect, a method for sensing at least one of an object and a motion adjacent a closure panel of a vehicle to facilitate operation of the closure panel is provided. The method includes providing a housing having a printed circuit board disposed therein and configuring the housing to be positioned on an undercarriage of the vehicle; disposing a radar emitting sensor on the printed circuit board and configuring the radar emitting sensor to emit a radar beam to detect at least one of an object and a motion about a periphery of the vehicle; and attaching a radar shield portion to the housing and configuring the radar shield portion to shape a detection zone formed by a pattern of a radar beam emitted from the radar emitting sensor.

In another aspect, the method can further include configuring the radar shield portion to be positioned generally at a geometric center of the undercarriage of the vehicle.

In another aspect, the method can further include configuring the annular wall to shape the detection zone about the entirety of the vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1A is an exploded view illustrating a first exemplary embodiment of a detection module mounted on a rear bumper of a motor vehicle according to one aspect of the disclosure;

FIG. 1B illustrates a second exemplary embodiment of a detection module mounted along a side of a motor vehicle according to another aspect of the disclosure;

FIG. 7A is a schematic perspective view of a radar shield portion of a detection module constructed in accordance with an aspect of the disclosure to provide the detection pattern of FIG. 7;

FIG. 8A is a top view of the detection pattern of FIG. 8;

FIG. 9 is a top view of the detection pattern of a detection module constructed in accordance with another embodiment of the disclosure;

FIG. 10 is a side view of an altered detection pattern of FIG. 6, in response to a vertical movement of the radar shield portion;

FIG. 11 is a side view of an altered detection pattern of FIG. 6, in response to a rotational movement of the radar shield portion;

DETAILED DESCRIPTION

Figure 2:
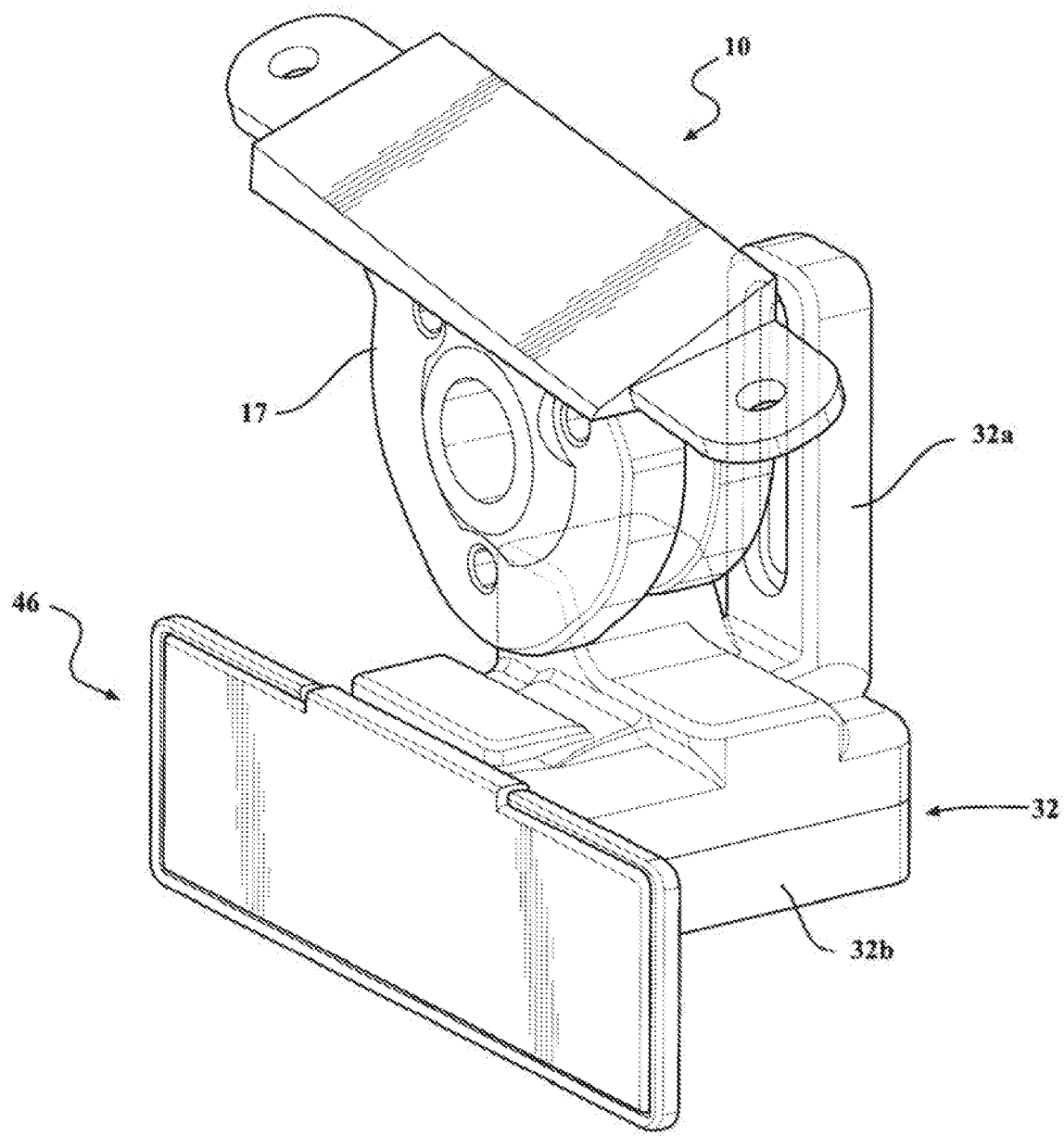
FIG. 2 is a front perspective view of a detection module constructed in accordance with one aspect of the disclosure.
Figure 2A:
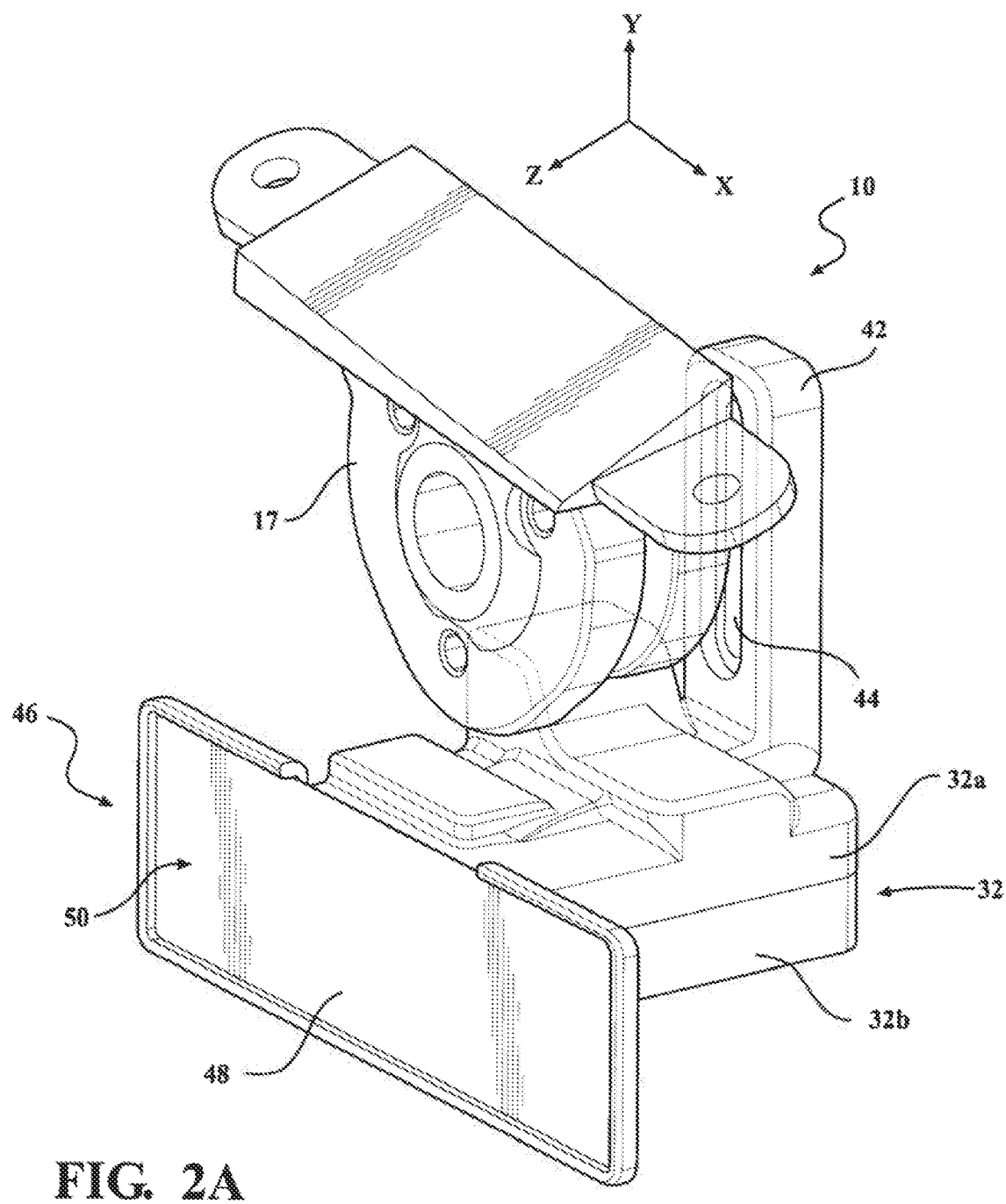
FIG. 2A is a view similar to FIG. 2 with a front cover removed therefrom.
Figure 3:
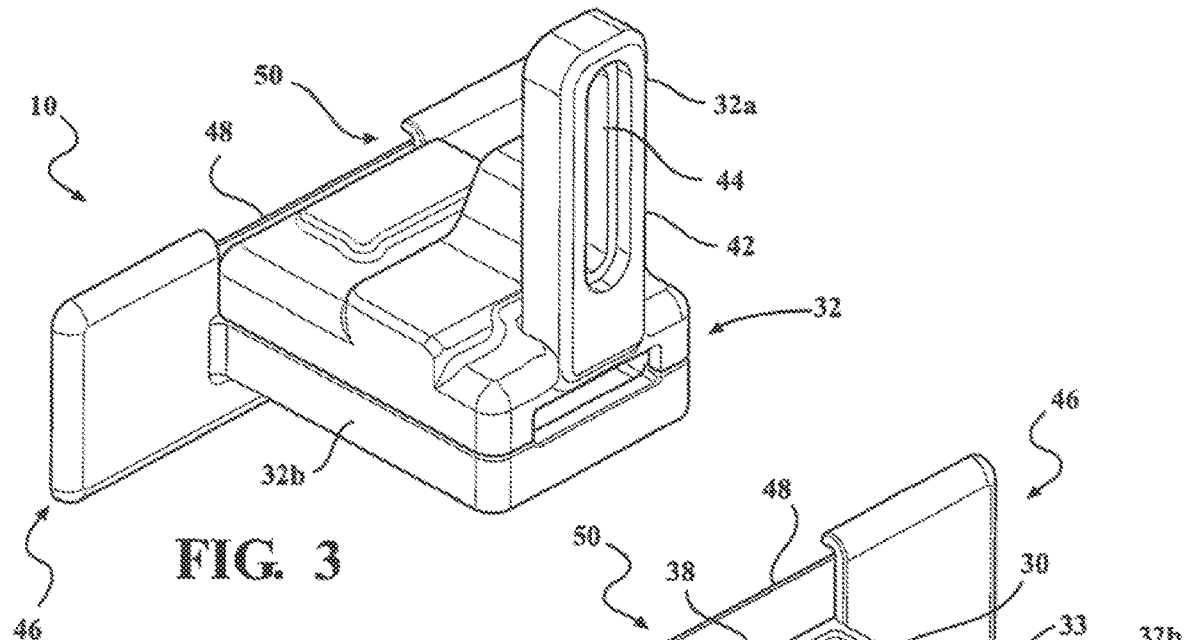
FIG. 3 is a rear perspective view of the detection module of FIGS. 2 and 2A.
Figure 3A:
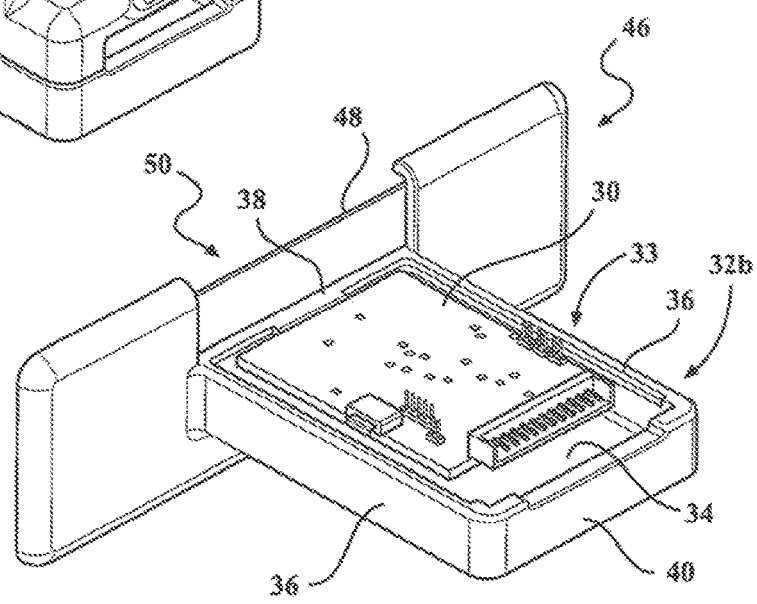
FIG. 3A is a view similar to FIG. 3 with a top cover removed therefrom.
Figure 3B:
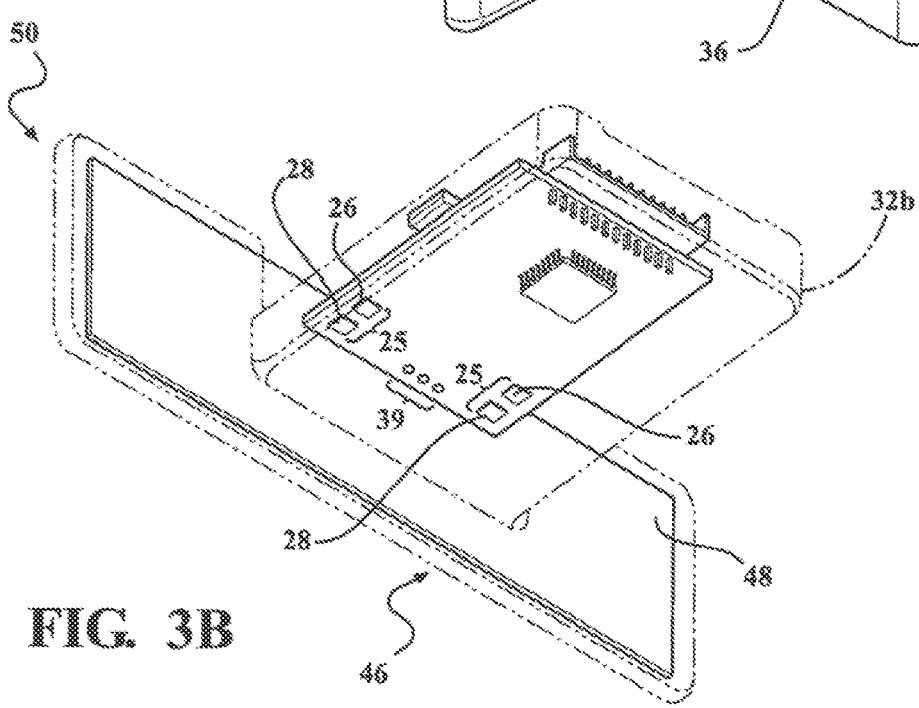
FIG. 3B is a front perspective view of the detection module of FIG. 3A.

In the following description, details are set forth to provide an understanding of the present disclosure. In some instances, certain circuits, structures and techniques have not been described or shown in detail in order not to obscure the disclosure, as they will be readily understood by one possessing ordinary skill in the art in view of the disclosure herein.

In general, the present disclosure relates to a detection system of the type well-suited for use in many vehicular closure applications. The detection system and associated methods of operation of this disclosure will be described in conjunction with one or more detection module example embodiments. However, the specific example embodiments disclosed are merely provided to describe the inventive concepts, features, advantages and objectives with sufficient clarity to permit those skilled in the art of vehicle detection systems to understand and practice the disclosure. Specifically, the example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Referring to the Figures, wherein like numerals indicate corresponding parts throughout the several views, a detection module 10 and a method of operating the detection module 10 are disclosed.

Figure 7:
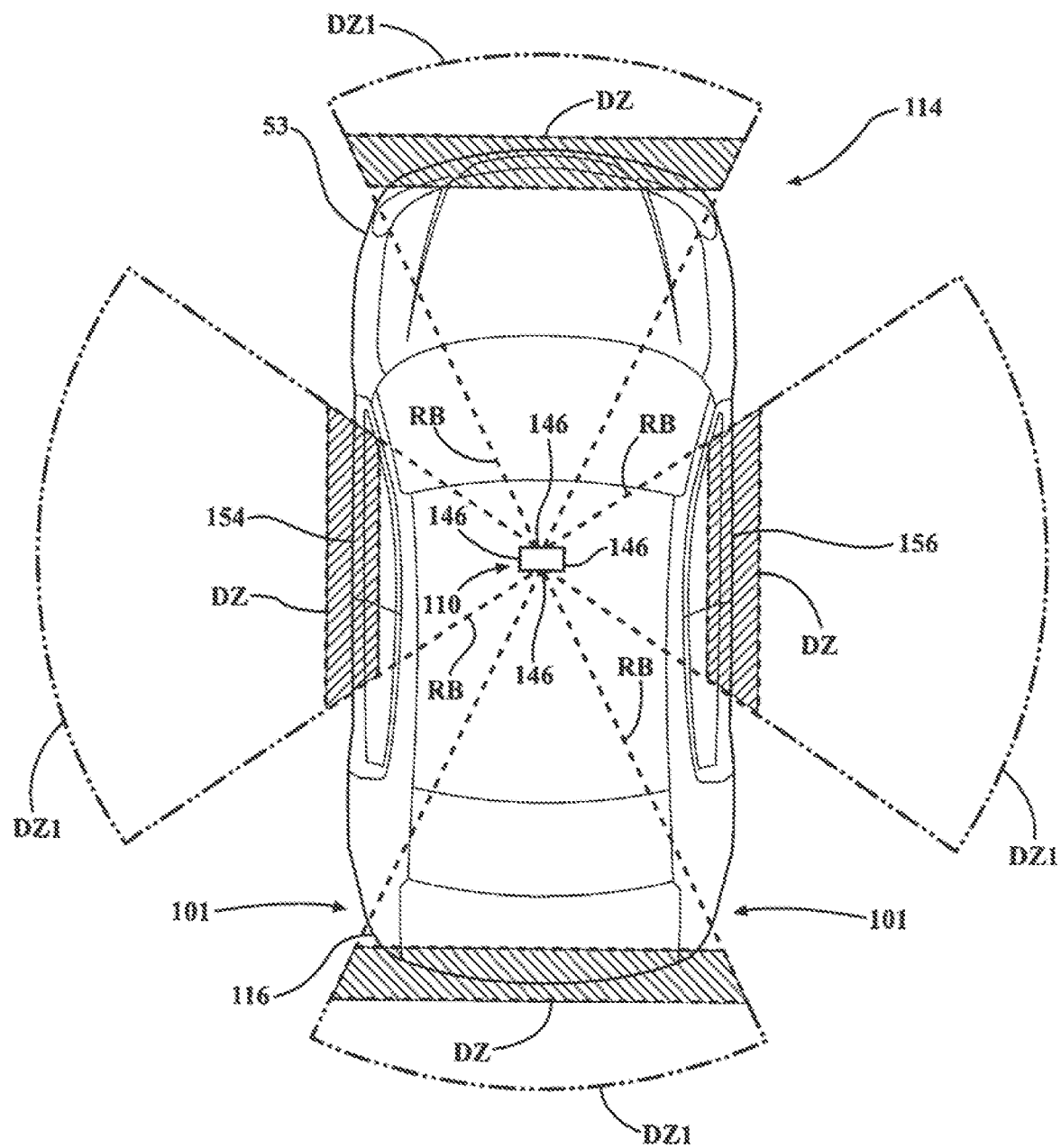
FIG. 7 is a schematic top view of a detection pattern provided from a detection module constructed in accordance with another aspect of the disclosure.

As best shown in FIGS. 1A and 1B, the detection module 10 is shown in accordance with respective exemplary first and second embodiments for a closure panel, such as a lift gate 12 and/or door 12' of a vehicle 14. The detection module 10 may be provided as an integral component of an existing vehicle component or fixed as a separate component to a frame member or other feature of the vehicle 14, which can be naturally positioned at a desired location and orientation relative to the closure panel 12, 12' to take advantage of the detection radar pattern and range (i.e., approximately 5 m). It is to be recognized that a single detection module 10 can be used for multiple closure panels 12, 12', such as shown in FIG. 7, by way of example and without limitation; however, using more than one detection module 10 to obtain a desired detection pattern is also contemplated herein. The detection module 10 for the lift gate 12 can be disposed on, behind or adjacent a rear bumper 16, and the detection module 10 for the door 12' can be disposed on, behind or adjacent a side beam (door sill) 18, shown as being beneath the door sill 18. It is to be further recognized that the detection module(s) 10 can be adapted to be disposed in any desired location of the vehicle 14 to provide the desired detection radar pattern for the intended application, as discussed further hereafter. To facilitate positioning the detection module 10 in a precise orientation to provide a precisely located radar detection pattern, the detection module 10 can be fixed to pivotal member, shown in FIG. 1A as a spherical bearing member 17, sometimes referred to as bearing pillow block, by way of example and without limitation, thereby allowing the detection module 10 to be pivoted about multiple X, Y, and/or Z axes and fixed in the desired position. Optionally, an actuator and rotatable assembly (both not shown) may be provided so as to adaptively rotate the module 10 to vary the detection zone (e.g. vary the radar pattern) based on the mode of operation of the module 10, or the terrain surrounding the vehicle 14.

Figure 4:
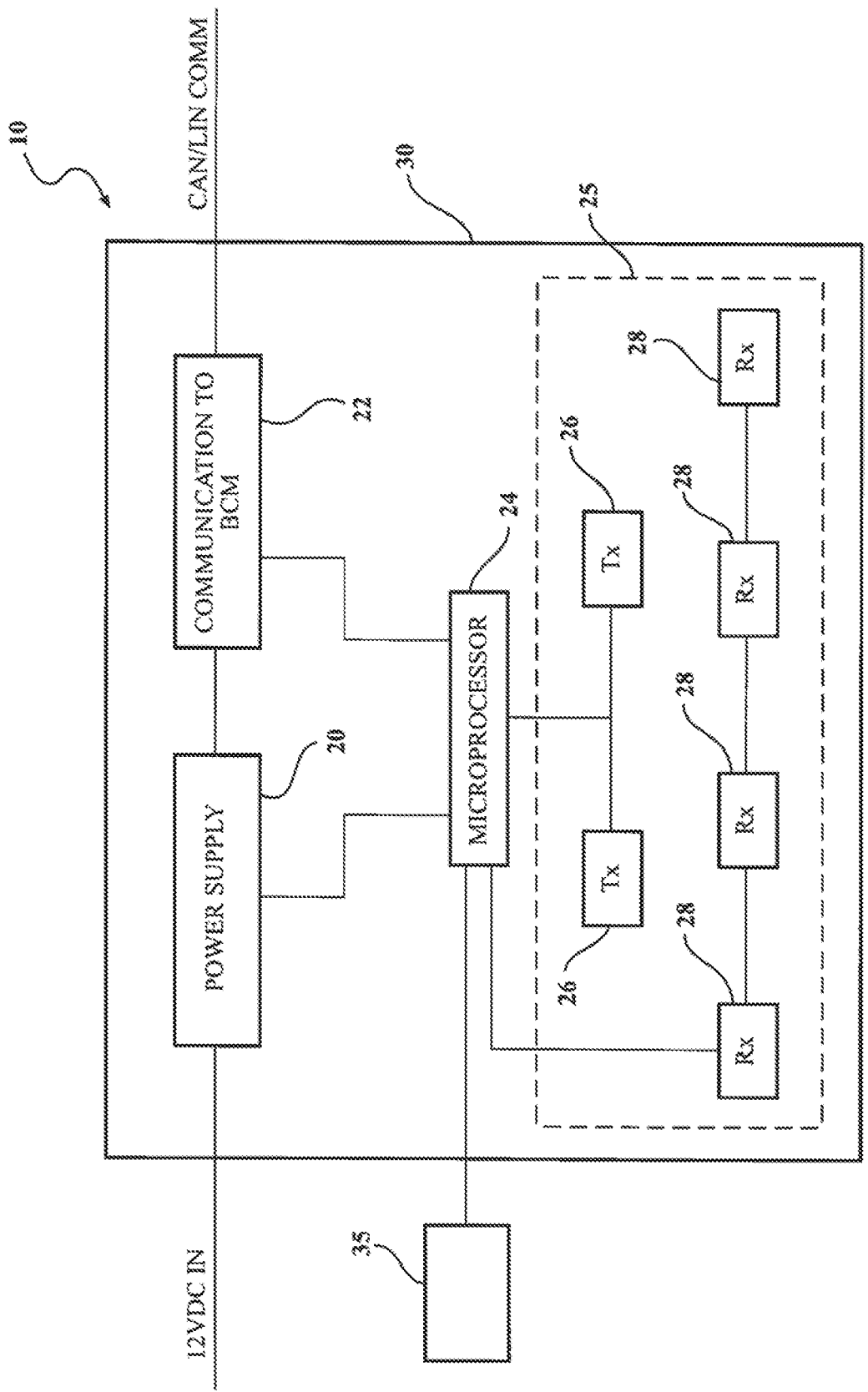
FIG. 4 is a schematic diagram of the detection module of FIGS. 2 and 2A.

As best shown schematically in FIG. 4, the detection module 10 can include a power supply unit 20 for coupling a power supply of the vehicle 14 to provide power to the detection module 10. Additionally, the detection module 10 can include a communication unit 22 electrically coupled to the power supply unit 20 for communicating with the plurality of vehicle system controllers, such as a body control module (BCM) (all not shown, but understood by one possessing ordinary skill in the art). Further yet, the detection module 10 can include a microprocessor 24 electrically coupled to the power supply unit 20 and communication unit 22 as well as to at least radar emitting sensor 25 (discussed below), all of which can be disposed on a sensor printed circuit board 30 (PCB) as an integral, modular sub-assembly.

The detection module 10 includes the at least one radar emitting sensor 25 for sensing at least one of an object and a motion adjacent the closure panel 12, 12' and outputting data corresponding to at least one of the object and the motion. Specifically, the at least one radar emitting sensor 25 includes a plurality of radar transmit antennas 26 for transmitting a plurality of radar beams RB outwardly therefrom and a plurality of radar receive antennas 28 for receiving signals from the plurality of radar beams RB emitted from the radar transmit antennas 26 subsequent to being reflected from the object, for example.

The plurality of radar transmit antennas 26 and the plurality of radar receive antennas 28 can be provided to operate at about 80 gigahertz, by way of example and without limitation. However, it is to be recognized that the plurality of radar transmit antennas 26 the plurality of plurality of radar receive antennas 28 may operate at other frequencies, as desired for the intended application.

The microprocessor 24 can be configured to be operable in a plurality of modes and electrically coupled to the power supply unit 20 and the at least one sensor 26, 28 of radar emitting sensor 25 and the communication unit 22 for operable communication therewith. In general, the use of radar (providing resolution, range, and material penetrating properties) properly positioned for coverage of a desired volume about the desired closure panel 12, 12' can perform the one or more detection functions, including gesture recognition and object detection. Additionally, the resolution provided by radar can provide increased resolution needed for gesture recognition (such as a passing foot, hand, and even facial gesture detection) at various ranges, for example, at foot level near the bumper 16 or about ground level, but also at distances away from lift gate 12 and/or door 12', if desired. Thus, the plurality of possible modes of the microprocessor 24 includes a gesture recognition mode, and can further include a park assist mode and an outward obstacle detection mode and an inward obstacle detection mode.

The gesture recognition mode can be provided for gesture recognition for lift gate 12 opening activation (e.g., detection of a foot, a hand, or a face gesture). Accordingly, if the lift gate 12 is closed and the vehicle 14 is in park, the detection module 10 can operate in the gesture recognition mode, awaiting a person to command opening of the lift gate 12 via an intended gesture. The position of the detection module 10 be configured and located to cover the area about the periphery of the vehicle 14, illustratively about an area able to detect foot or leg gestures or motions, or the height of a human for other gesture recognition, and the resolution of the radar-based transmit and receive sensor 26, 28 can provide for detection of precise gestures for controlling intended activation of the closure panel 12. When operating in the gesture recognition mode, the detection module 10 can command operation of the closure panel 12 (i.e. open) by activating a closure actuator/motor subsequent to a positive activation/access gesture (e.g. a foot motion, foot rotation, step-in, step-out, a foot or hand swipe, a hold, or the like). For example when operating in the outward obstacle detection mode, the detection module 10 can command operation of the closure panel 12 (i.e. open) by deactivating or stopping a closure actuator/motor, or alternatively, for establishing the environment about the vehicle 14 for baselining the detection zone of the detection module 10, i.e. to vary the detection zone DZ based on a curb, snow pile, irregularities in the terrain about the vehicle 14 and the like. For example when operating in the inward obstacle detection mode, the detection module 10 can command operation of the closure panel 12 (i.e. open) by deactivating or stopping a closure actuator/motor.

The microprocessor 24 can be configured to determine which of the one or more modes should be active based on communication with one or more vehicle system controllers (e.g., body control module). The microprocessor 24 is configured to execute software code and/or instructions stored on a memory unit (not shown), such as an EEPROM or other type or memory device such as a solid state disk, RAM, hard disk or the like. A power source, such as a battery, may provide power to the microprocessor 24.

In addition, the microprocessor 24 can be configured to receive and process data corresponding to the at least one of the object and motion from the at least one radar emitting sensor 25 based on the determination of which of the plurality of modes should be active. Finally, the microprocessor 24 can be configured to initiate movement of the closure panel 12 in response to processing the data corresponding to the at least one of the object and the motion (gesture recognition).

Additionally, the detection module 10 can include a housing 32, shown by way of example in a non-limiting aspect has including an upper housing member 32a and a lower housing member 32b. At least a portion of the housing 32 permits the radar beam RB to pass therethrough, and in accordance with the one aspect, a portion of the housing 32 can be provided as being transparent to the passage of the radar beam RB. In the non-limiting embodiment illustrated in FIGS. 2, 2A, and 3-3B, the lower housing member 32b is constructed of a radiolucent or transparent plastic for the passage of radio waves therethrough. The lower housing member 32b further includes a receptacle 33 configured for receipt of the PCB 30 therein, with the receptacle 33 shown, by way of example and without limitation, as being delimited by a floor 34 and upstanding sidewalls 36 extending between an upstanding front wall 38 and an upstanding rear wall 40. It is contemplated herein that an opening could be formed in the housing 32, such as in the lower housing member 32b, and a lens cover could be coupled to the lower housing member 32b to extend over the printed circuit board 30 for covering the opening and allowing light from a plurality of light emitting diodes 39 forming part of an optional lighting subassembly integral with printed circuit board 30, or separate therefrom, to shine outwardly from the detection module 10, if desired, and optionally illuminate on the ground the corresponding detection zone DZ to a user to visually inform the user the precise location of the detection zone DZ.

The upper housing member 32a is formed to extend over and enclose the receptacle 33 of lower housing member 32b to protect the PCB 30 and components thereon against damage and exposure to environmental elements. The upper housing member 32a can be shaped and otherwise configured as desired, as can the lower housing member 32b. Further, the upper and/or lower housing member 32a, 32b can be configured having attachment features, with the upper housing member 32a being shown, by way of example and without limitation, as having such an attachment feature in the form of an upstanding arm or boss 42. The boss 42 has a through opening, shown as an elongate through slot 44, to facilitate attachment of the detection module 10 to the vehicle 14, such as via the pivotal spherical bearing member 17, which in turn is configured to be fixed to the desired location on the vehicle 14. The elongate slot 44 allows for adjustment up-and-down, vertically along a Y axis, while the spherical bearing member 17 allows for pivotal movement about X, Y, Z axes (FIG. 2), as will be understood by the skilled artisan.

The housing 32, and shown as the lower housing member 32b, by way of example and without limitation, further includes a radar shield portion 46 extending upwardly (e.g. vertically), shown as in transverse or substantially transverse relation to the floor 34 along the front wall 38, by way of example and without limitation. The radar shield portion 46 is radiopaque, thereby preventing the passage of radio waves therethrough. Radar shield portion 46 may be configured to reflect or absorb the plurality of radar beams RB that impinge upon the radar shield portion 46. In accordance with one non-limiting aspect, the radar shield portion 46 of lower housing member 32b can be formed to carry a radiopaque member 48, such as a metal plate or some other material that acts as a barrier to the passage of radio waves therethrough. The metal plate 48 is shown disposed and fixed within a receptacle 50 formed as a single piece of plastic material with the lower housing member 32b, such as in a molding process, by way of example and without limitation, though the metal plate 48 could be otherwise fixed to the upper housing member 32a in addition to or in lieu of being fixed to lower housing member 32b, as will be recognized by a skilled artisan. The metal plate 48 is shown as extending transversely to the floor 34 of the lower housing member 32b, (and thereby illustratively extending transversely to the plane of the sensor printed circuit board 30 (PCB)), and thus, the metal plate 48 extends in transverse or substantially transverse (meaning it can be slightly more or less, such as by about 10 degrees, for example) relation to the ground surface 13 on which the vehicle 14 travels. In another embodiment, an actuator and rotatable/pivotable assembly, such as a drive gear or member configured in driving relation with a turntable-like support platform or otherwise (both not shown), may be provided so as to adaptively rotate and/or pivot metal plate 48 relative to the housing (with the housing 32 being non-rotatable relative to the vehicle 14) to selectively vary and alter the size, shape and/or location of the detection zone DZ (e.g. vary the radar pattern) based on the mode of operation of the detection module 10, or the terrain surrounding the vehicle 14. For example, when the detection module 10 is operating in an obstacle detection mode, it may detect that the vehicle 14 has been parked next to an elevated curb, or next to a pile of snow, which may prevent a user from placing their foot in the detection zone DZ normally associated with a flat surface/ground plane, and thus, not being able to activate the detection system absent adjustment of the detection system. Accordingly, the system of detection module 10 may adaptively vary the detection zone DZ (e.g. by rotating, pivoting, raising or lowering the detection module 10 and/or the radar shield portion 46) to compensate for loss of access to detection zone DZ due to an object, terrain, curb, or the like.

With the radar shield portion 46 located in front of the respective radar transmit and receive antennas 26, 28 for alignment with at least a portion of the path of radar beam RB emitted and received thereby, at least a portion of the radio waves of radar beam RB being emitted are blocked or absorbed (recognizing that an RF absorptive material or coating could be applied to the radar shield portion 46 in combination with or in lieu of the metal plate 48), and thus, less than the entirety of the radio waves of radar beam RB being emitted pass beyond the radar shield portion 46. Accordingly, the radar shield portion 46 can be located, shaped and contoured as desired to provide a predetermined radar pattern formed by radar beam RB beyond the radar shield portion 46, thereby establishing a precisely patterned and shaped 3-D detection zone DZ (FIGS. 5-7), as discussed in more detail hereafter.

Figure 5:
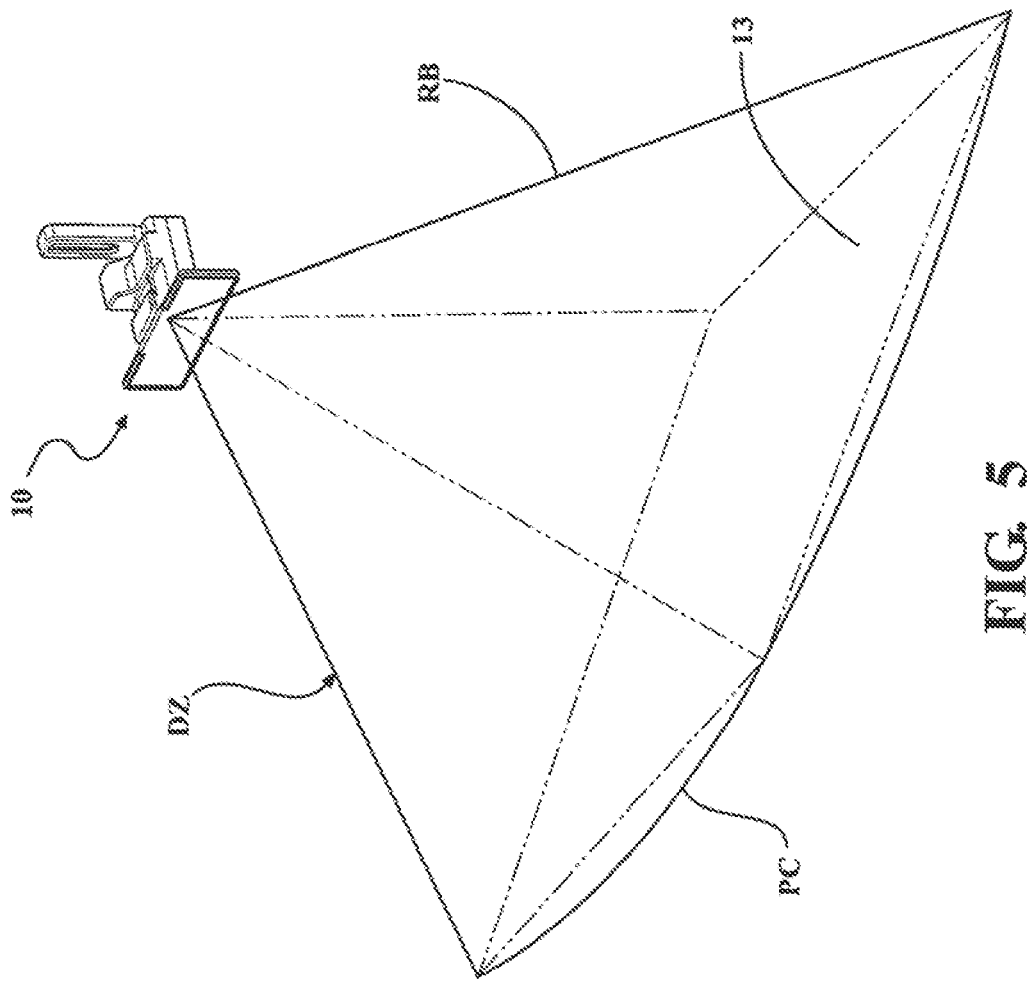
FIG. 5 is a schematic perspective view of a detection pattern in accordance with one aspect of the detection module of FIGS. 2 and 2A.

As shown in FIG. 5, the radar shield portion 46 can be configured to form a detection zone DZ having a radar volume shaped similarly to the contour of the rear bumper 16, with the detection zone DZ extending below the rear bumper 16, but not beyond the vertically downward projection of the rear bumper 16 (FIG. 5 illustrates a peripheral contour of the rear bumper 16 projected onto the ground, referred to as projected contour PC, with the radar detection zone DZ shown as not extending outwardly away from the vehicle 14 beyond the projected contour PC), thereby avoiding the unwanted "false detection" of a passerby walking near the rear bumper 16 or some other remote movement. Of course, it is to be recognized that the detection zone DZ can be precisely tailored (shaped, sized, contoured, projected) and altered in real-time to adjust for obstacles, impediments and the like, as discussed above, as desired, and thus, it could be shaped and projected to extend beyond the bumper 16 a predetermined distance and over a predetermined area and pattern, if desired.

Figure 6:
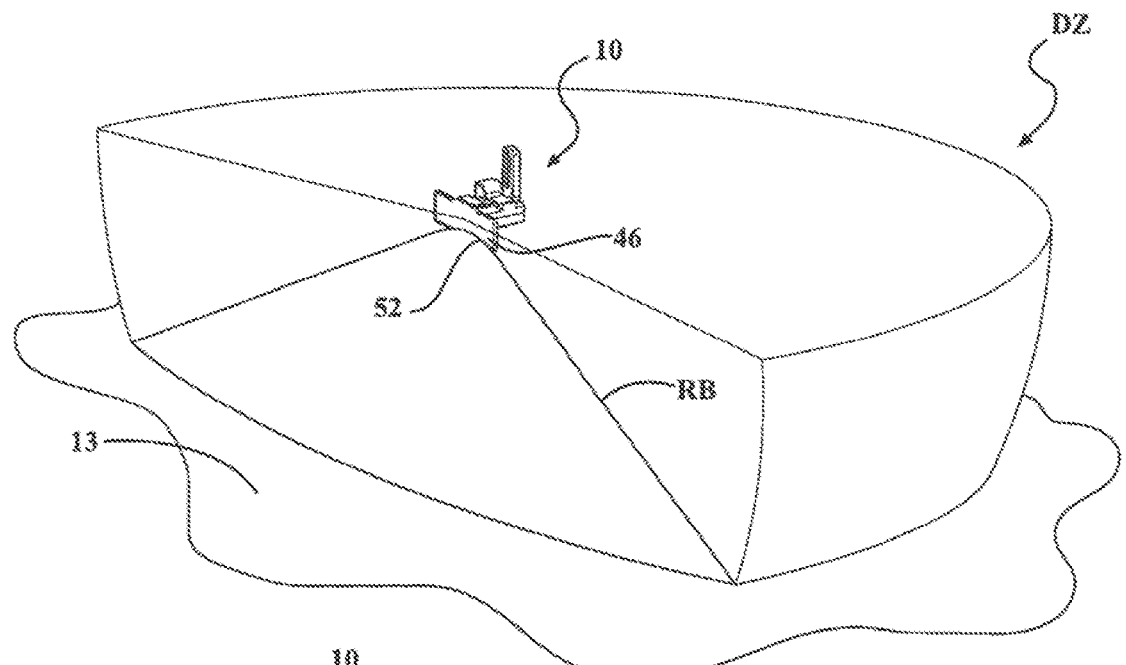
FIG. 6 is a schematic perspective view of a detection pattern in accordance with another aspect of the detection module of FIGS. 2 and 2A.
Figure 6A:
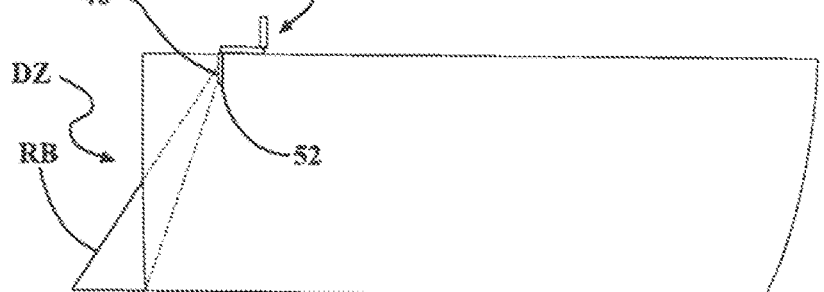
FIG. 6A is a side view of the detection pattern of FIG. 6.
Figure 6B:
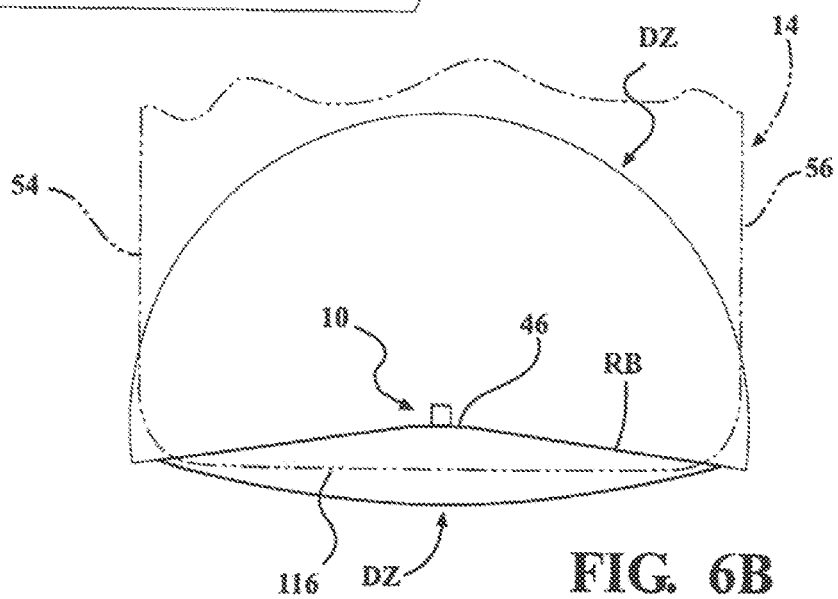
FIG. 6B is a top view of the detection pattern of FIG. 6.

In FIGS. 6-6B, a detection zone DZ patterned in accordance with another aspect is shown. The radar shield portion 46 is shown, similarly as shown in FIGS. 2-5, as being a planar or substantially planar member, with radar shield portion 46 having an arcuate, concave lower edge 52 shaped to produce the 3-D volume of emitted radar beam RB illustrated, which extends in part toward, but not beyond or not substantially beyond, the rear bumper 16, as discussed above. The remaining portion of the radar beam RB can extend unobstructed in non-shaped fashion between the opposite sides 54, 56 and beneath the vehicle 14 toward a front end of vehicle 14 without presenting a concern of false detections, as illustrated. Of course, it is contemplated herein that the lower edge 52 or any other portion of the radar shield portion 46 could be configured as necessary to produce any desired detection zone DZ shape.

Figure 8:
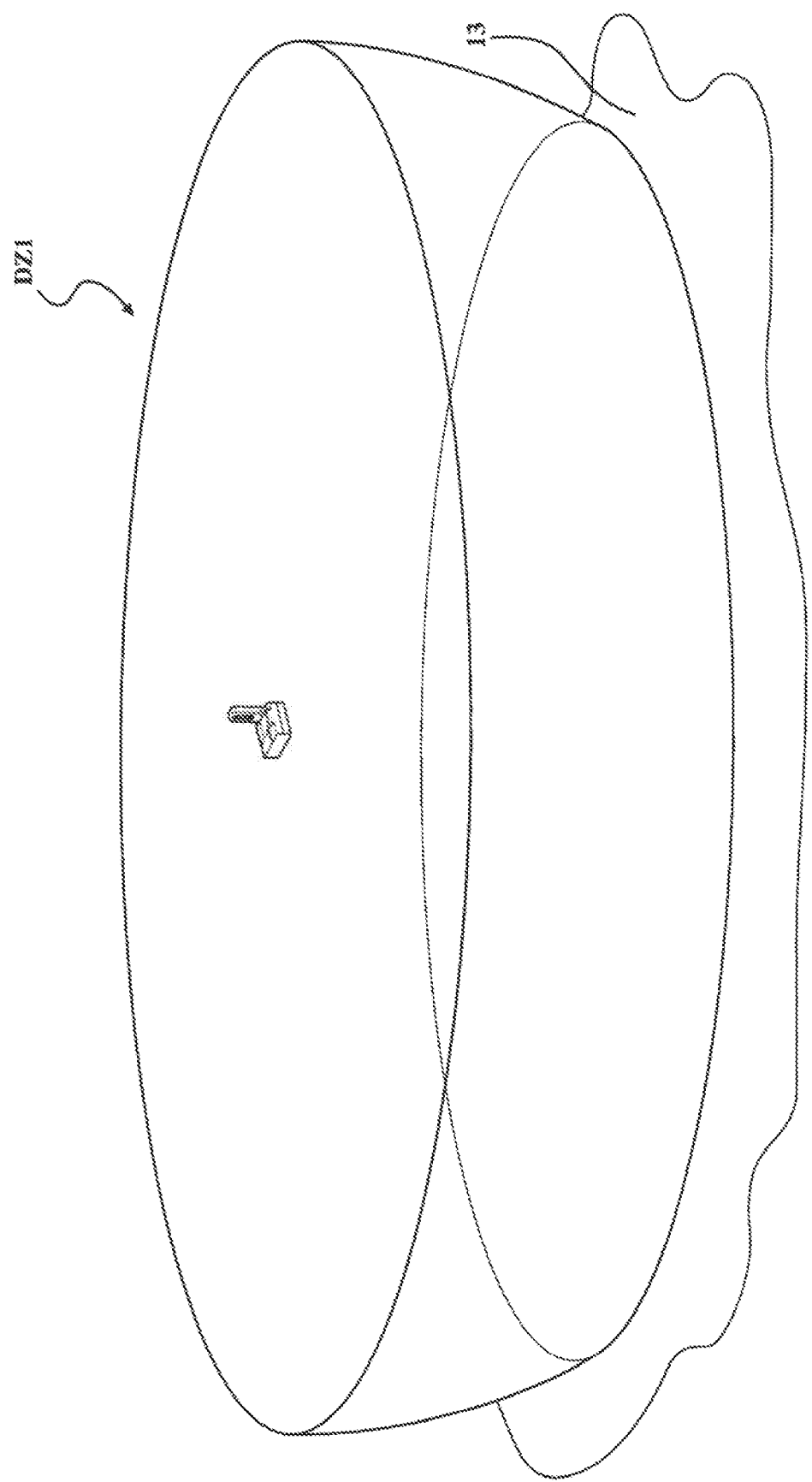
FIG. 8 is a schematic perspective view of a detection pattern in accordance with another aspect.
Figure 8B:
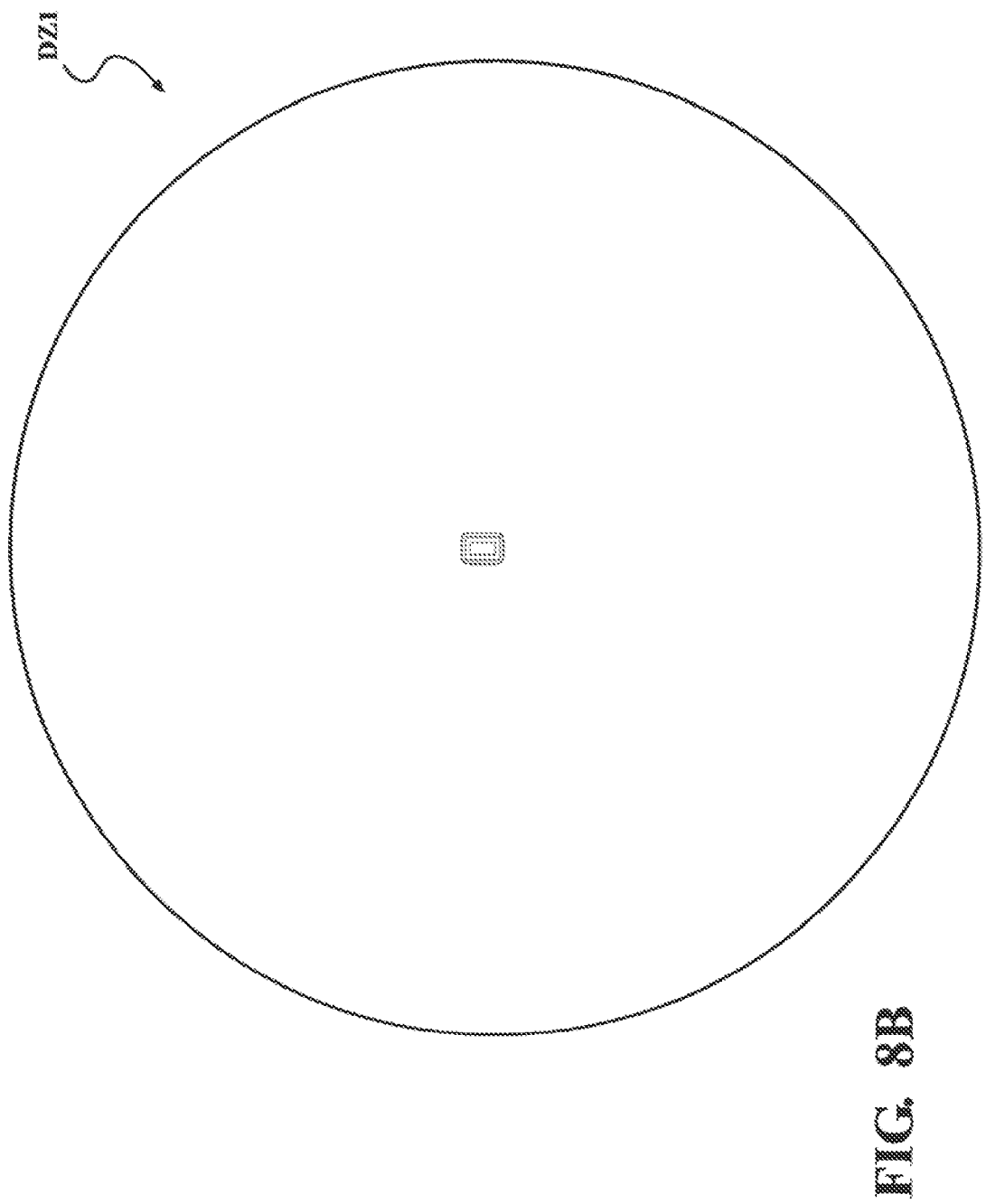
FIG. 8B is a top view of the detection pattern of FIG. 8.

In FIG. 7, a vehicle 114 having a detection module 110 constructed in accordance with another aspect is shown, wherein the same reference numerals as used above, offset by a factor of 100, are used to identify like features. The detection module 110 is formed similarly as discussed above; however, a radar shield portion 146 (FIG. 7A) is configured to provide the detection zone DZ illustrated, with a portion of the detection zone DZ being configured to extend along a projection of a front bumper 153, along a projection of opposite sides 154, 156 of the vehicle 114, and along a projection of a rear bumper 116. Illustratively, the radar protection shield 146 includes a length L aligned parallel with of opposite sides 154, 156 and a width W, lesser in dimension compared to the length L, and aligned parallel to the opposite front 157 and rear 159 of the vehicle 114. To form the detection zone DZ illustrated, the radar protection shield 146 surrounds a PCB 130 and radar emitting sensor 125 thereon, including radar transmit antennas 126 and radar receive antennas 128, and also including optional LED's 139 for illuminating the DZ, with a contoured wall 58, (i.e. illustratively having arcuate bottom edges 152, by way of example and without limitation) being formed of a radiopaque material or having a suitable radiopaque coating, as discussed above. The wall 58, as noted, is shaped having recessed contours 152, such as concave contours as discussed above for radar shield portion 46, but in all four sides of the continuous annular wall 58 facing the respective opposite sides 154, 156, front bumper 53 and rear bumper 116. Illustratively, the contoured wall 58 is shown formed from four intersecting wall portions, but a single wall portion (such as a circumferentially continuous, monolithic annular wall) may be provided. If not for the radar shield portion 146, the radar pattern would be unconfined, as shown at DZ1 (also shown in FIGS. 8-8B), which could result in unwanted "false" detections, such as from nearby objects and/or pedestrians. Of course, in view of this further aspect, one possessing ordinary skill in the art will recognize, in view of the disclosure herein, that the radar shield portion 46, 146 can be configured and located to produce any desired size and shape detection zone DZ along any portion of the vehicle 14, 114, (e.g. to precisely follow a periphery, also referred to as outer perimeter, of the vehicle 14, 114) wherein the radar shield portion 146 producing the detection zone DZ illustrated in FIG. 7 is located on an underside 113, or undercarriage, of the vehicle 114, shown by way of example and without limitation, as being at a geometric center or approximate geometric center of the underside of the vehicle 114. With such a geometrically centered positioning, a single detection module 110 may be provided to detect motion or gestures along the entirety of the outer periphery (e.g. immediately below the outermost periphery of the vehicle 114 or adjacent to the periphery) of the entire vehicle 114, or a portion thereof depending on the contoured wall 58 configuration for activation of multiple closures panels (e.g. side front and rear passenger closure panels, bonnet or frunk, and liftgate or rear trunk.)

Now referring to FIG. 9, there is shown a detection module 210 constructed in accordance with another non-limiting aspect, wherein the same reference numerals as used above, offset by a factor of 200, are used to identify like features. The detection module 210 is shown disposed about each corner 60 of a vehicle bumper 216 of a vehicle 214. The detection module 210 has a radar shield portion 246 formed from a plurality of perpendicularly disposed portions, also referred to as sides 46a, 46b, having contoured bottom edges 252, as discussed above for bottom edges 52, 152, for shaping the radar pattern of a detection zone DZ to match or closely match with the projected contour PC of the periphery of the vehicle corner 60. Other radar patterns for a detection zone DZ about the corners 60 may also be provided with each side 46a, 46b being formed, for example, at oblique angles relative to one another, and having bottom edges so as to produce a desired detection pattern, as will be readily understood by a person possessing ordinary skill in the art in view of the disclosure herein.

Now referring to FIG. 10 the detection module 10 can include a powered actuator unit 35 in communication with microprocessor 24 for imparting a movement of the radar shield portion 46 (e.g. the bottom portion 37) in an upward or downward direction (e.g. vertically V) direction. The powered actuator unit 35 may be configured to move the entire housing 32 upwardly or downwardly, for example by a rack and pinion configuration provided within slot 44. The powered actuator unit 35 may be configured to move the radar shield portion 46 upward or downwardly, for example by a rack and pinion configuration coupled with receptacle 50 to impart a vertical motion of the receptacle 50 when the powered actuator unit 35 is controlled by microprocessor 24. Other such actuations configurations may be provided. As a result of the vertical movement the radar shield portion 46, the detection zone DZ can be varied e.g. increased away from the detection module 10 or decreased towards the detection module 10 in response to the radar shield portion 46 being moved in a blocking position or a non-blocking position of the plurality of radar beams RB. Illustratively, FIG. 10 shows the vertically upward displacement of the radar shield portion 46 in response to a control command to the powered actuator unit 35 received from the microprocessor 24 resulting in an increase of the detection zone DZ away from the detection module 10.

Now referring to FIG. 11 the detection module 10 can include a powered actuator unit 35 in communication with microprocessor 24 for imparting a movement of the radar shield portion 46 in a pivotal direction (e.g. rotational R) direction. The powered actuator unit 35 may be configured to rotate the entire housing 32, for example by a gear configuration provided between spherical bearing member 17 and boss 42. The powered actuator unit 35 may be configured to pivot the radar shield portion 46 and cause a motion of radar shield portion 46 upward or downwardly. As a result of the rotational movement the radar shield portion 46, the detection zone DZ can be varied e.g. increased away from the detection module 10 or decreased towards the detection module 10 in response to the radar shield portion 46 being moved in a blocking position or a non-blocking position of the plurality of radar beams RB. Illustratively, FIG. 11 shows the clockwise rotational and vertically upward displacement of the bottom portion 37 of radar shield portion 46 in response to a control command to the powered actuator unit 35 received from the microprocessor 24 resulting in an increase of the detection zone DZ away from the detection module 10.

Microprocessor 24 may be programmed to preset or adaptively set the detection zone DZ (e.g. command powered actuator unit 35). For example, microprocessor 24 may command powered actuator unit 35 as a result of manufacturer preference as programmed in the factory, a user preference as preconfigured by a user, (e.g. via a computer interface system within the vehicle in communication with the microprocessor 24, or in response to approach of a user assigned FOB having preconfigured user preferences), or to set the detection zone in a dynamic and adaptive manner in response to determining the environmental conditions surrounding the vehicle 14 (e.g. in snow conditions, the detection zone DZ may be configured to be increased to offset any snow obstacles to increase the ease of placement of a foot in the detection zone DZ, and reduced for example in crowded areas, such as parking lots or busy streets where more pedestrians may approach the vehicle 14 and cause false detections.

Figure 13:
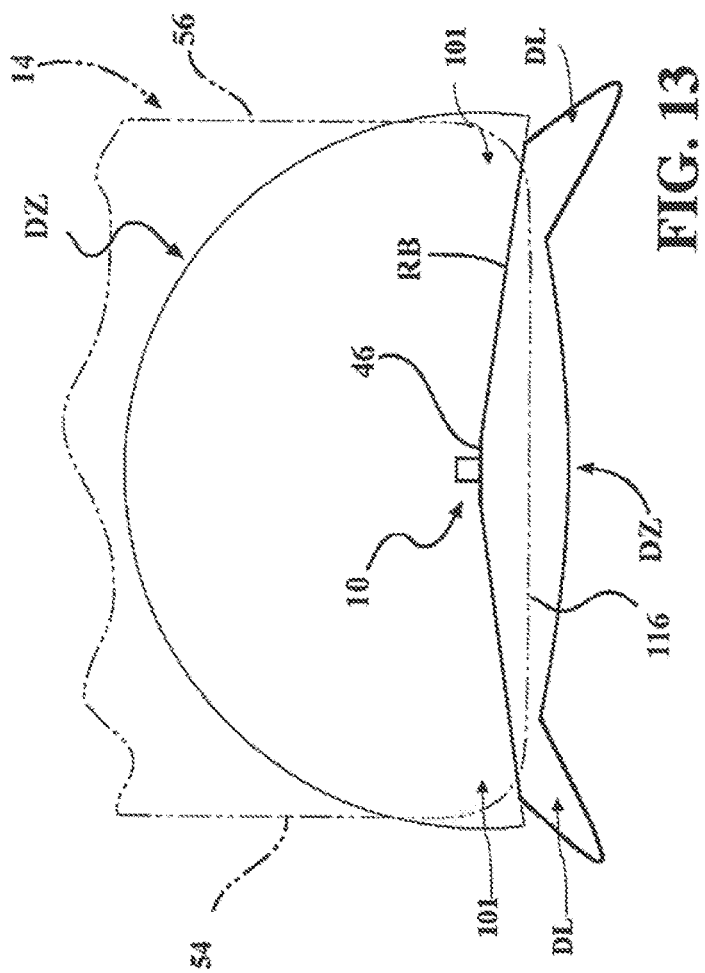
FIG. 13 is a top view of a detection pattern formed using the radar shield portion of FIG. 12.
Figure 12:
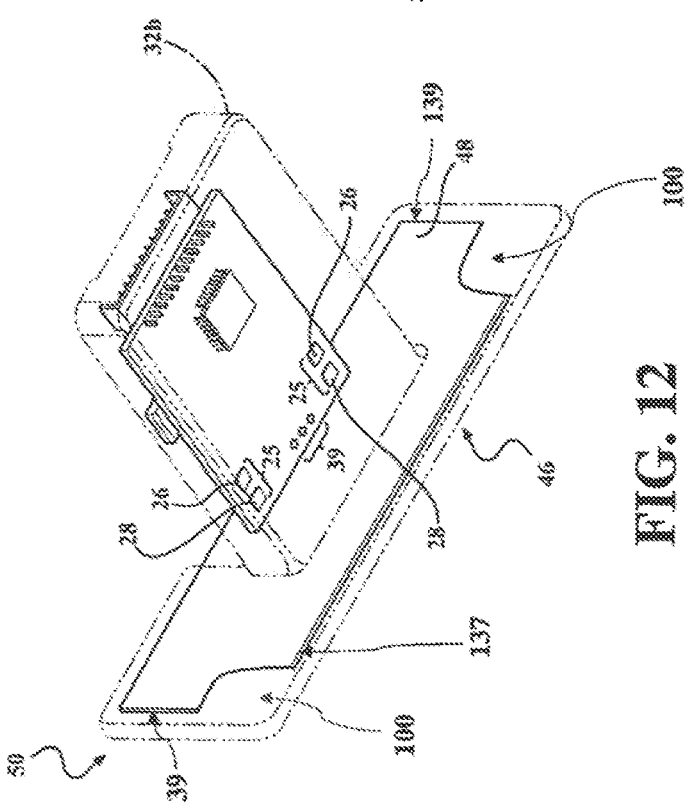
FIG. 12 is a front perspective view of the detection module of FIG. 3A, including end notches provided in the radar shield portion, in accordance with an illustrative embodiment.

Now referring to FIGS. 12 and 13, in accordance with an illustrative embodiment, the radar shield portion 46 may include notches 100 for altering the detection zone DZ. For example FIG. 12 illustrates two opposite notches 100 formed partially along the bottom edge portion 137 and the side edge portion 139, for allowing radar beams RB to pass there though. As a result the detection zone DZ can be altered as a result of the selected shape and size of the notches 100. As shown in FIG. 13 resulting side detection zone lobs DL increase the detection zone in specified areas, without increasing the overall detection zone. The detection zone DZ can therefore be increased away from the module 10, and the vehicle 14, within specific areas (e.g. adjacent the bumper corners 101) without increasing the overall detection zone to thereby reduce false detections.

Figure 15:
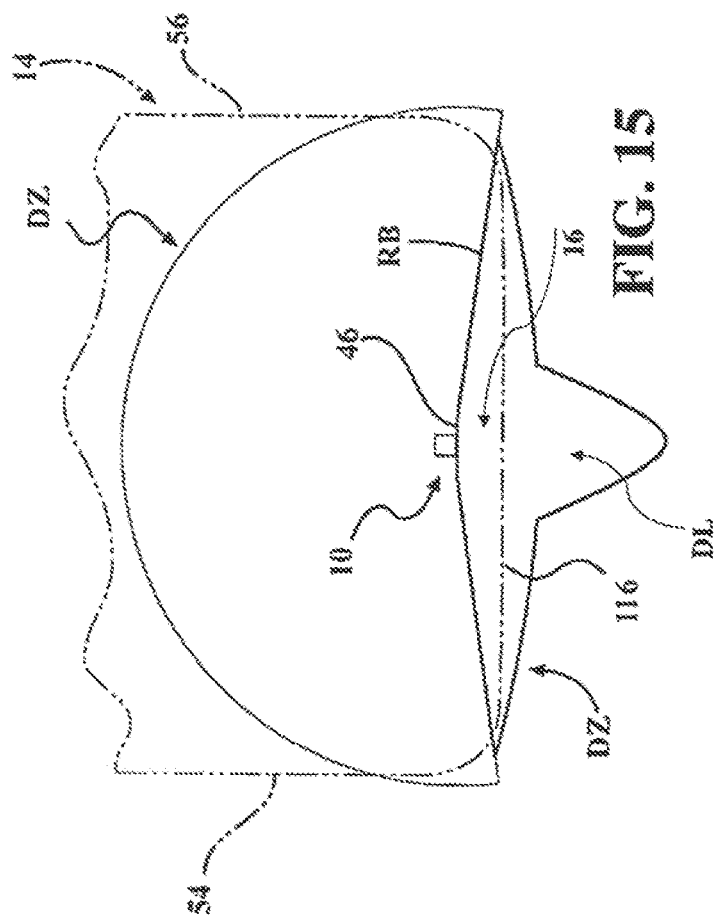
FIG. 15 is a top view of a detection pattern formed using the radar shield portion of FIG. 14.
Figure 14:
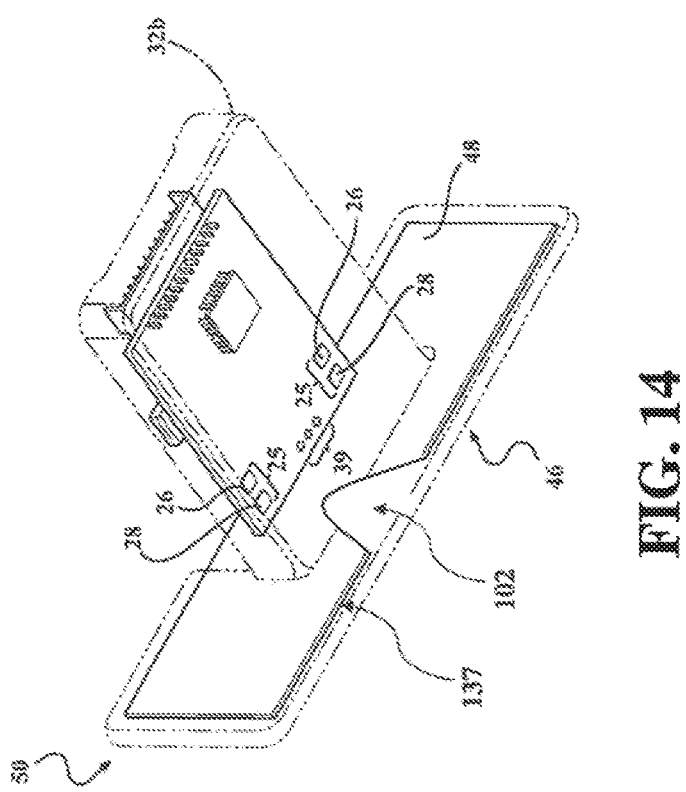
FIG. 14 is a front perspective view of the detection module of FIG. 3A, including a center notch provided in the radar shield portion, in accordance with an illustrative embodiment.

Now referring to FIG. 14 and FIG. 15, in accordance with an illustrative embodiment, the radar shield portion 46 may include a center notch 102 for altering the detection zone DZ. For example FIG. 13 illustrates a center notch 102 extending upwardly from bottom edge portion 37, for allowing radar beams RB to pass therethrough. As a result the detection zone DZ can be altered as a result of the selected shape and size of the notch 102. As shown in FIG. 15 resulting center detection zone lob DL increases the detection zone DZ in a specified area, without increasing the overall detection zone. The detection zone DZ can therefore be increased away from the module 10, and the vehicle 14, within the specific area (e.g. away from a center of the bumper 16) without increasing the overall detection zone to thereby reduce false detections. It is recognized other number of notches, shapes (oval, triangular, square), and dimensions may be provided to alter the detection zone in a desired manner.

Figure 16:
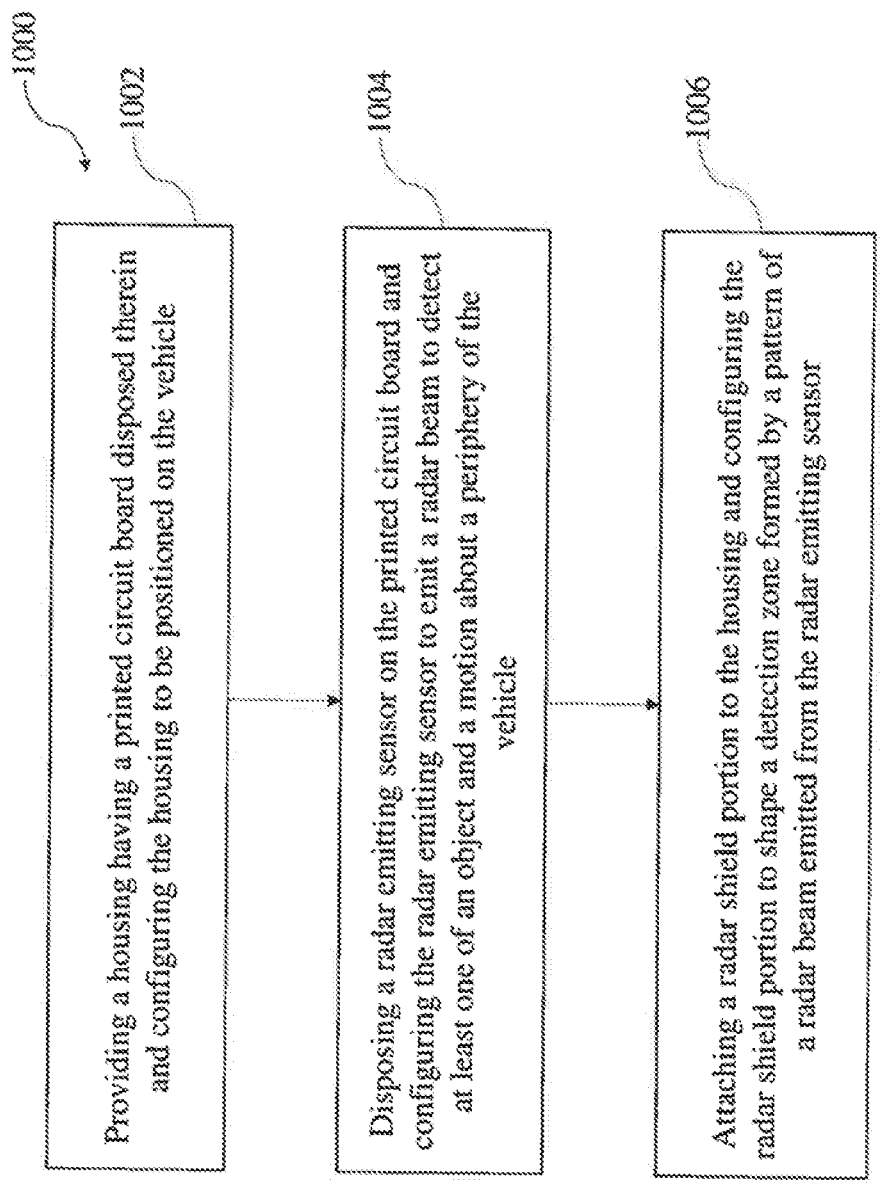
FIG. 16 is a flow chart illustrating a method for sensing at least one of an object and a motion adjacent a closure panel of a vehicle to facilitate operation of the closure panel, in accordance with an illustrative embodiment.

In accordance with another aspect of the disclosure, and with reference to FIG. 16, a method for sensing at least one of an object and a motion adjacent a closure panel of a vehicle to facilitate operation of the closure panel 1000 is provided. The method 1000 includes providing a housing having a printed circuit board disposed therein and configuring the housing to be positioned on the vehicle, such as for example on an undercarriage of the vehicle 1002; disposing a radar emitting sensor on the printed circuit board and configuring the radar emitting sensor to emit a radar beam to detect at least one of an object and a motion about a periphery of the vehicle 1004; and attaching a radar shield portion to the housing and configuring the radar shield portion to shape a detection zone formed by a pattern of a radar beam emitted from the radar emitting sensor 1006.

In another aspect, the method 1000 can further include configuring the radar shield portion to be positioned generally at a geometric center of the undercarriage of the vehicle.

In another aspect, the method 1000 can further include configuring the annular wall to shape the detection zone about the entirety of the vehicle.

In another aspect, the method 1000 can further include moving the radar shield at least one of vertically and pivotally to alter the shape of the detection zone.

Clearly, changes may be made to what is described and illustrated herein without departing from the scope of the description and further defined in the accompanying claims. The detection module disclosed may operate with any kind of different closure devices within the motor vehicle, for example.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with the example detection system can likewise be implemented into many other systems to control one or more operations and/or functions.

What is claimed is:

1. A detection module for a closure panel of a vehicle, comprising:
   a housing;
   a radar emitting sensor disposed in said housing, said radar emitting sensor being configured to sense a gesture immediately adjacent an outer periphery of the closure panel and to output data corresponding to the gesture to command operation of the closure panel; and
   a radar shield portion operably attached to said housing, said radar shield portion being configured to shape a detection zone formed by a pattern of a radar beam emitted from said radar emitting sensor, wherein said radar shield portion prevents the passage of the entirety of the radar beam therethrough to provide the shape of the detection zone immediately adjacent the outer periphery of the closure panel.

2. The detection module of claim 1, wherein said radar shield portion is a substantially planar member.

3. The detection module of claim 1, wherein said radar shield portion forms a wall that surrounds a printed circuit board supporting said radar emitting sensor.

4. The detection module of claim 3, wherein said wall is configured to shape said radar pattern about the entirety of a periphery the vehicle.

5. The detection module of claim 1, wherein said radar shield portion includes a radiopaque material.

6. The detection module of claim 1, wherein said radar emitting sensor includes a plurality of light emitting diodes disposed on a printed circuit board, said light emitting diodes being configured to illuminate said detection zone.

7. The detection module of claim 1, wherein said radar shield portion includes a plurality of sides.

8. The detection module of claim 7, wherein said radar shield portion includes at least a pair of sides extending in transverse relation with one another.

9. A detection module for a closure panel of a vehicle, comprising:
   a housing;
   a radar emitting sensor disposed in said housing, said radar emitting sensor being configured to sense at least one of an object and a motion adjacent the closure panel and to output data corresponding to at least one of an object and motion;
   a radar shield portion operably attached to said housing, said radar shield portion being configured to shape a detection zone formed by a pattern of a radar beam emitted from said radar emitting sensor; and wherein said radar shield portion has a metal insert.

10. A detection module for a vehicle, comprising:
    a housing configured to be positioned on an undercarriage of the vehicle;
    a printed circuit board disposed in said housing;
    a radar emitting sensor disposed on said printed circuit board, said radar emitting sensor being configured to emit a radar beam and detect at least one of an object and a motion about at least one side of the vehicle; and
    further including a radar shield portion operably attached to said housing, said radar shield portion being configured to shape at least a portion of said radar beam emitted from said radar emitting sensor to form a shaped radar pattern, wherein said radar shield portion includes a non-planar wall, wherein said non-planar wall is configured to be positioned generally at a geometric center of the undercarriage of the vehicle and to shape said shaped radar pattern about the entirety of the vehicle.

11. The detection module of claim 10, wherein said non-planar wall is configured to surround said printed circuit board.

12. The detection module of claim 10, wherein said radar emitting sensor includes a plurality of light emitting diodes on said printed circuit board, said light emitting diodes being configured to illuminate said detection zone.

13. A method for sensing a gesture immediately adjacent a closure panel of a vehicle to command operation of the closure panel, comprising:
- providing a housing having a printed circuit board disposed therein and configuring the housing to be positioned on the vehicle;
- disposing a radar emitting sensor on the printed circuit board and configuring the radar emitting sensor to emit a radar beam to detect the gesture about a periphery of the vehicle; and
- attaching a radiopaque radar shield portion to the housing and configuring the radiopaque radar shield portion to shape a detection zone formed by a pattern of a radar beam emitted from the radar emitting sensor, wherein the detection zone is shaped to project onto a ground surface below a vertically downward projection of the closure panel.

14. The method of claim 13, further including configuring the housing to be positioned on the vehicle and configuring the radiopaque radar shield portion to be positioned generally at a geometric center of the undercarriage of the vehicle.

15. The method of claim 13, wherein the radiopaque radar shield portion is configured to be mobile and is configured to include moving the radiopaque radar shield portion at least one of vertically and pivotally to alter the shape of the detection zone.

* * * * *